United States Patent [19]
Yamamoto

[11] Patent Number: 6,014,234
[45] Date of Patent: Jan. 11, 2000

[54] IMAGE READER

[75] Inventor: Yasuhiro Yamamoto, Tokyo, Japan

[73] Assignee: Asahi Kogaku Kogyo Kabushiki Kaisha, Tokyo, Japan

[21] Appl. No.: 09/097,703

[22] Filed: Jun. 16, 1998

[30] Foreign Application Priority Data

Jun. 16, 1997 [JP] Japan ................................. 9-175186

[51] Int. Cl.[7] .............................. H04N 1/04; H04N 1/46; G03F 3/08

[52] U.S. Cl. .................... 358/522; 358/505; 358/474; 358/475

[58] Field of Search .................... 358/474, 475, 358/482, 483, 486, 487, 496, 505, 506, 509, 513, 522; 348/296, 297, 298, 229, 362, 363, 367; 250/208.1

[56] References Cited

U.S. PATENT DOCUMENTS

| | | | |
|---|---|---|---|
| 4,843,474 | 6/1989 | Suzuki | 348/230 |
| 4,881,127 | 11/1989 | Isoguchi et al. | 348/296 |
| 4,963,985 | 10/1990 | Isoguchi et al. | 348/348 |
| 5,510,623 | 4/1996 | Sayag et al. | 250/370.11 |
| 5,929,908 | 7/1999 | Takahashi et al. | 348/364 |

OTHER PUBLICATIONS

Browne, M.;Brown, A., "A smart high resolution scanning CCD camera", Engineering in Medicine and Biology Society, 1988., Proceeding of the Annual International Conference of the IEEE, pp. 384–385 vol. 1.

*Primary Examiner*—Kimberly A. Williams
*Attorney, Agent, or Firm*—Greenblum & Bernstein, P.L.C.

[57] ABSTRACT

An image reader has an image sensor for sensing an image, as a series of pixel signals, by exposing the sensor to light rays. The sensor exhibits a characteristic curve, having at least a partial linear section, describing a relationship between a level-value of a pixel signal and an exposure period over which the sensor is exposed to the light rays. First and second effective maximum level-values are determined from first and second series of pixel signals, obtained by exposing the sensor to the light rays, over first and second exposure periods, respectively. The second exposure period is longer than the first exposure period. The exposure periods are encompassed within the partial linear section of the characteristic curve, and an optimal exposure period of the image is determined based on the first and second effective maximum level-values corresponding to the first and second exposure periods, and an effective maximum level-value corresponding to the optimal exposure period.

32 Claims, 30 Drawing Sheets

FIG.12

| ADDRESS | NUMBER OF SIGNALS | |
|---|---|---|
| 0000 | $R_1K[0000]$ | ⎫ |
| ⋮ | ⋮ | ⎬ $H_{1(R)}$ |
| 1023 | $R_1K[1023]$ | ⎭ |
| 1024 | $G_1K[0000]$ | ⎫ |
| ⋮ | ⋮ | ⎬ $H_{1(G)}$ |
| 2047 | $G_1K[1023]$ | ⎭ |
| 2048 | $B_1K[0000]$ | ⎫ |
| ⋮ | ⋮ | ⎬ $H_{1(B)}$ |
| 3071 | $B_1K[1023]$ | ⎭ |
| 3072 | $R_2K[0000]$ | ⎫ |
| ⋮ | ⋮ | ⎬ $H_{2(R)}$ |
| 4095 | $R_2K[1023]$ | ⎭ |
| 4096 | $G_2K[0000]$ | ⎫ |
| ⋮ | ⋮ | ⎬ $H_{2(G)}$ |
| 5119 | $G_2K[1023]$ | ⎭ |
| 5120 | $B_2K[0000]$ | ⎫ |
| ⋮ | ⋮ | ⎬ $H_{2(B)}$ |
| 6143 | $B_2K[1023]$ | ⎭ |

IMAGE READER

BACKGROUND OF THE INVENTION

1. Field of the Invention

The present invention relates to an image reader for optically and electronically sensing and reading an image, which is recorded on a suitable recording medium, such as a transparency, a sheet of paper or the like, by illuminating the recording medium with a light source and by scanning the illuminated recording medium with a line image sensor.

2. Description of the Related Art

Such an image reader per se is well known, and is used in peripheral equipment associated with an image-processing computer for retrieving an image. The image reader includes a solid-state line image sensor, such as a CCD (charge-coupled device) image sensor, a suitable light source for illuminating a recording medium carrying an image recorded thereon, and an optical system for focusing light rays, passing through or reflected by the recording medium, on a light receiving surface of the CCD line image sensor.

The CCD line image sensor includes a plurality of CCD elements aligned with each other, and each of the CCD elements generates and accumulates an electric charge in accordance with a received amount of light rays. As is well known, the CCD line image sensor possesses an electronic shutter function, and a time of electric-charge-accumulation or a time of exposure may be suitably regulated by using the electronic shutter function. As long as the CCD line image sensor is exposed to the light rays (if the electronic shutter is not "closed" and exposure continues), a degree of electric charge in each of the CCD elements is gradually increased, and the CCD elements finally reach saturation with the accumulated electric charges.

In operation, the recording medium, while being illuminated with light rays emitted from the light source, is scanned with the CCD line image sensor. The CCD line image sensor is exposed to the light rays, passing through or reflected by the recording medium, whereby a recorded image of the recording medium is optically and electronically sensed and read. During the reading of the recorded image from the recording medium, the time of exposure, over a period of which the CCD line image sensor is exposed to the light rays, should be optimally regulated before the read image can be obtained with the best contrast.

An optimal exposure time is varied in accordance with a change in transparency of a recorded image due to the reading of another recording medium. Accordingly, the optimal exposure time must be determined in accordance with the transparency of the recording medium. Conventionally, prior to a regular scanning operation for sensing and reading the recorded image from the recording medium, a pre-scanning operation is performed in order to determine an optimal exposure time with respect to the recorded image of the recording medium concerned.

Nevertheless, conventionally, it is impossible to accurately determine the optimum exposure time, because a method for determining the optimum exposure time is based on an inaccurate assumption that there is a directly linear relationship between a time of exposure and a degree of electric charge accumulation in the CCD line sensor, as discussed hereinafter in detail.

SUMMARY OF THE INVENTION

Therefore, an object of the present invention is to provide an image reader, using a solid-state line image sensor for optically and electronically sensing and reading a recorded image of a recording medium, wherein an exposure time can be optimally and accurately, regulated during the optical and electronic sensing and reading of the recorded image from the recording medium by the solid-state line image sensor.

In accordance with an aspect of the present invention, there is provided an image reader comprising: a light source that illuminates a recorded image of a recording medium with light rays emitted therefrom, and an image sensor that optically and electronically senses the recorded image, as a series of image-pixel signals, by exposing the image sensor to the light rays with which the recorded image is illuminated. Also included in the image reader are: a first determiner that determines a first effective maximum level-value from a first series of image-pixel signals, which is obtained by exposing the image sensor to the light rays over a first exposure period, and a second determiner that determines a second effective maximum level-value from a second series of image-pixel signals, which is obtained by exposing the image sensor to the light rays, over a second exposure period being longer than the first exposure period, wherein an optimal exposure period of the recorded image is determined from a proportional calculation based on the first effective maximum level-value corresponding to the first exposure period, the second effective maximum level-value corresponding to the second exposure period, and an effective maximum level-value corresponding to the optimal exposure period.

The image sensor exhibits a characteristic curve, having at least a partially linear section, describing a relationship between a level-value of an image-pixel signal and an exposure period over which the image sensor is exposed to the light rays, and the first exposure period and the second exposure period are encompassed within the partially linear section of the characteristic curve.

The proportional calculation may be based on the following formula:

$$T_{OPT} = [(L_{MAX} - L_1)/(L_2 - L_1)] * (t_2 - t_1) + t_1$$

Herein: $T_{OPT}$ indicates the optimal exposure period;

$L_{MAX}$ indicates the effective maximum level-value corresponding to the optimal exposure period;

$t_1$ indicates the first exposure period;

$L_1$ indicates the first effective maximum level-value corresponding to the first exposure period;

$t_2$ indicates the second exposure period; and $L_2$ indicates the second effective maximum level-value corresponding to the second exposure period.

The first determiner may comprise a first histogram-producer that produces a first histogram on the basis of the first series of image-pixel signals, and determines the first effective maximum level-value from the first histogram, and the second determiner may comprise a second histogram-producer that produces a second histogram on the basis of the second series of image-pixel signals, and determines the second effective maximum level-value from the second histogram.

Each of the first effective maximum level-value and the second effective maximum level-value may be defined as a boundary-level-value of a predetermined area, including an actual-maximum level-value, of the corresponding histogram.

Preferably, the image sensor comprises a line image sensor, and the sensing of the recorded image from the recording medium is performed by scanning the recorded image with the line image sensor. In this case, the scanning of the recorded image with the line image sensor may be carried out by intermittently and relatively moving the recorded image with respect to the line image sensor, and the exposure of the line image sensor to the light rays over the first exposure period and the exposure of the line image sensor to the light rays over the second exposure period may be successively carried out during the intermittent stoppage of the recorded image with respect to the line image sensor.

Also, preferably, each of the first histogram-producer and the second histogram-producer partially produces the corresponding histogram whenever the exposure of the line image sensor to the light rays over the corresponding exposure period is carried out.

BRIEF DESCRIPTION OF THE DRAWINGS

The object and other objects of the present invention will be better understood from the following description, with reference to the accompanying drawings in which:

FIG. 12 is a conceptual view showing histograms developed in a memory of the image reader shown in FIGS. 1 and 2;

DESCRIPTION OF THE PREFERRED EMBODIMENTS

Figure 1:
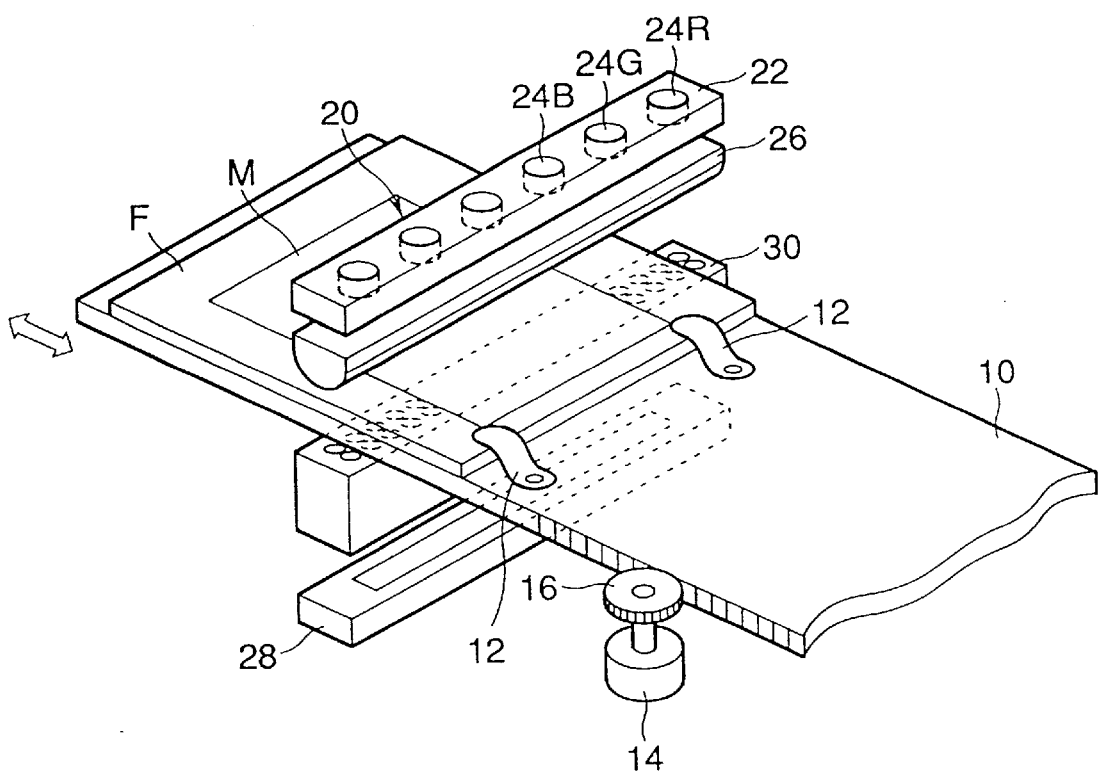
FIG. 1 is a schematic perspective view of a first embodiment of an image reader according to the present invention.

FIG. 1 schematically shows a first embodiment of an image reader according to the present invention, which is constituted so as to read a recorded color image from a transparent object, such as a positive transparency film, a negative transparency film or the like. Note, in FIG. 1, the transparent object is indicated by reference M, and the transparent object M is held by a frame holder F.

The image reader comprises a plate-like carriage 10 on which the frame holder F is detachably mounted. Namely, the carriage 10 is provided with a pair of spring fasteners 12 attached thereto, by which the frame holder F is releasably fastened onto the carriage 10. Although not visible in FIG. 1, a rectangular opening is formed in the carriage 10, the opening being large enough to encompass the transparent object M.

The plate-like carriage 10 is movable in the directions indicated by an open arrow shown in FIG. 1, and the movement of the carriage 10 is carried out by a suitable drive motor 14, such as a stepping motor, a servo motor or the like. Namely, the drive motor 14 has a pinion 16, fixedly mounted on an output shaft thereof, which is meshed with a rack 18 formed on a longer side of the carriage 10.

The image reader also comprises a light source 20, which includes an elongated frame member 22 having red-light emitters 24R, green-light emitters 24G and blue-light emitters 24B supported thereby. Although only six light emitters (24R, 24G, 24B) are representatively shown in FIG. 1, in actuality, a plurality of red-light emitters 24R, a plurality of green-light emitters 24G and a plurality of blue-light emitters 24B are held in the elongated frame member 22 and are alternately arranged uniformly therealong. Each of the light emitters may comprise a light emitting diode (LED) emitting a predetermined monochromatic light (red, green or blue).

As shown in FIG. 1, the light source 20 is arranged transversely above a path along which the carriage 10, and therefore the transparent object M, is moved. The plurality of red-light emitters 24R, the plurality of green-light emitters 24G, and the plurality of blue-light emitters 24B are cyclically turned ON in a predetermined order. For example, in succession, the red-light emitters 24R are turned ON, emitting red-light rays, then the green-light emitters 24G are turned ON, emitting green-light rays, and finally the blue-light emitters 24B are turned ON, emitting blue-light rays. Namely, the emissions of the three-primary colors of light from the light source 20 are cyclically repeated in the order of: the red-light emission, the green-light emission and the blue-light emission.

The image reader further comprises a cylindrical condenser lens 26, interposed between the light source 20 and the path of the transparent object M. The monochromatic light rays (red, green or blue), emitted from the light source 20, are condensed by the cylindrical condenser lens 26 and are directed in parallel toward the transparent object M.

Furthermore, the image reader comprises a one-dimensional CCD line image sensor 28, and a focusing lens system 30 associated therewith. The CCD line image sensor 28 is arranged transversely below the path of the transparent object M, and is aligned with the optical axes of the elongated light source 20. In this embodiment, the focusing lens system 30 is formed as a rod lens array, and is interposed between the CCD line image sensor 28 and the path of the transparent object M. Due to the focusing lens system 30, the monochromatic light rays, passing through the transparent object M, are focused onto a linear light-receiving surface of the CCD line image sensor 28.

The CCD line image sensor 28 includes a plurality of CCD elements aligned with each other, and the linear light-receiving surface is formed by the alignment of the CCD elements. Each of the CCD elements generates and accumulates electric charge in accordance with an amount of light rays received thereby, and a degree of accumulation of electric charge in each CCD element depends on a time of exposure of the CCD elements of the CCD line image sensor 28 to the light rays. Namely, the CCD line image sensor is provided with an electronic shutter function, by which the time of exposure, i.e. a time of electric-charge-accumulation, is regulated, as stated hereinafter in detail.

Figure 2:
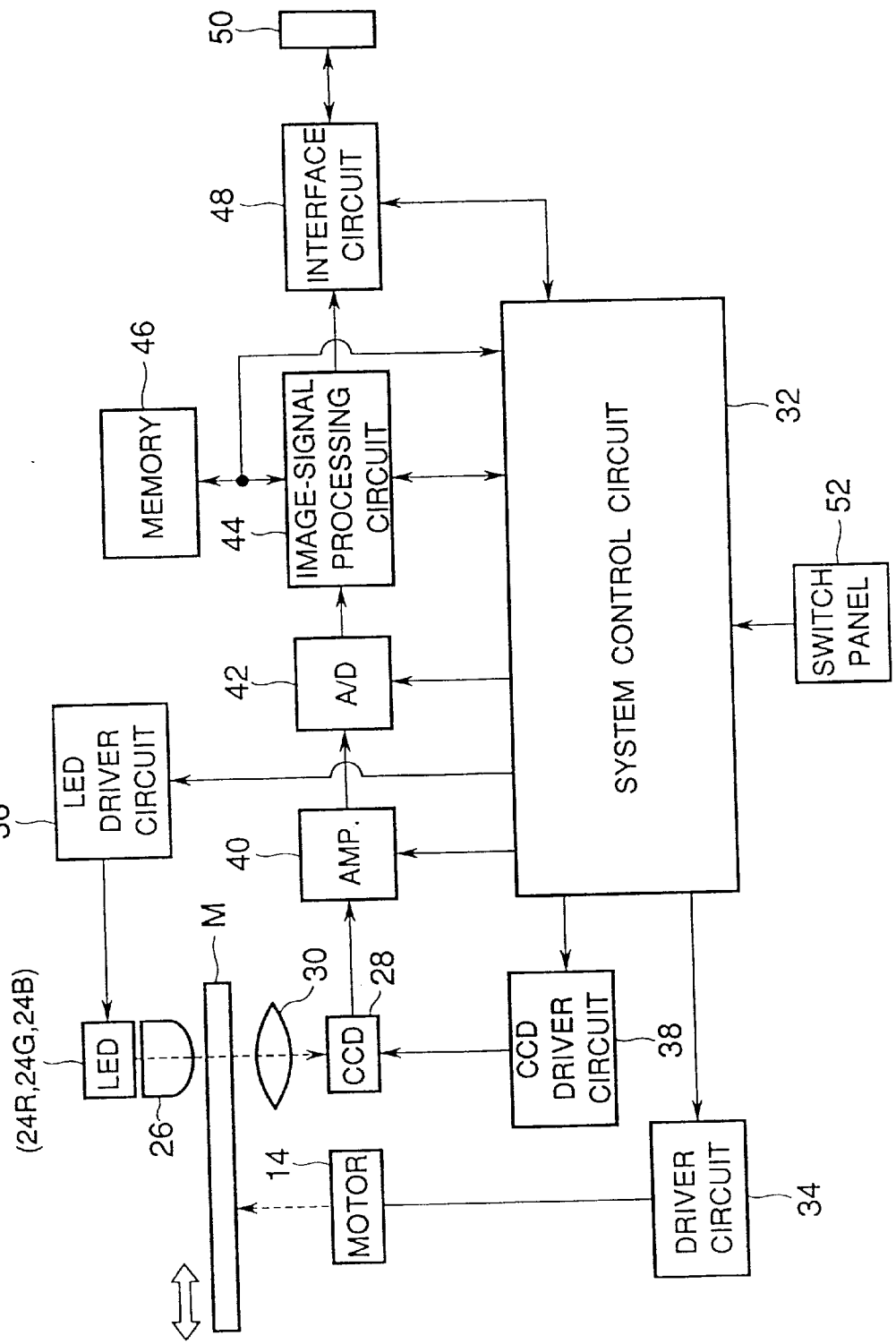
FIG. 2 is a schematic block diagram of the image reader shown in FIG. 1.

FIG. 2 schematically shows a block diagram of the image reader shown in FIG. 1. The image reader is provided with a system control circuit 32, which may be constituted as a microcomputer comprising a central processing unit (CPU), a read-only memory (ROM) for storing programs, constants, etc, and a random access memory (RAM) for storing temporary data.

As shown in FIG. 2, the drive motor 14 is connected to the system control circuit 32, through a driver circuit 34, and is driven on the basis of a series of drive pulses outputted from the driver circuit 34, which is operated by the system control circuit 32. During a reading operation of the image reader, the drive motor 14 is intermittently driven in such a manner that the plate-like carriage 10, and therefore the transparent object M, is intermittently moved to pass between the cylindrical condenser lens 26 and the focusing lens system 30, whereby the transparent object M is scanned in a step-by-step manner with the CCD line image sensor 28.

The LED's 24R, 24G and 24B of the light source 20 are connected to the system control circuit 32, via an LED driver circuit 36, and are electrically powered by the LED driver circuit 36, which is operated by the system control circuit 32. In this embodiment, the red LED's 24R, the green LED's 24G and the blue LED's 24B are cyclically and successively turned ON as mentioned previously. Namely, the emissions of the primary colors of light from the light source 20 are cyclically repeated in the order of the red-light emission, the green-light emission and the blue-light emission during the intermittent stoppage of the carriage 10. In particular, the transparent object M is subjected to one cycle of the successive emissions of the primary colors of light during each standstill of the transparent object M when being intermittently moved.

When the transparent object M is illuminated with the monochromatic light rays (red, green, blue) of the colored light emitters, the monochromatic light rays concerned, having passed through the cylindrical condenser lens 26 and the transparent object M, are focused, by the focusing lens system 30, onto the linear light-receiving surface of the CCD line image sensor 28. Accordingly, when the electronic shutter of the CCD line image sensor 28 is opened, electrical charges are started to be generated and accumulated in the CCD elements of the CCD line image sensor 28.

The CCD line image sensor 28 is connected to the system control circuit 32, through a CCD driver circuit 38, and is then driven by the CCD driver circuit 38. The accumulated electrical charges are outputted as a single-line of image-pixel signals, from the CCD line image sensor 28, by driving the CCD driver circuit 38 under control of the system control circuit 32.

The single-line of image-pixel signals, outputted from the CCD line image sensor 28, is amplified by an amplifier 40, and is then converted into a single-line of digital image-pixel signals by an analog-to-digital (A/D) converter 42. The amplifier 40 and the A/D converter 42 are operated under control of the system control circuit 32.

The single-line of digital image-pixel signals, outputted from the A/D converter 42, is inputted to an image-signal processing circuit 44, in which the single-line of digital image-pixel signals is subjected to various processes, such as a shading-correction, a gamma correction and so on. The processed single-line of digital image-pixel signals is then stored in a memory 46.

When the sensing or reading of the recorded image of the transparent object M, i.e. a scanning operation of the transparent object M with the CCD line image sensor 28, is completed, the memory 46 stores three frames of primary-color digital image-pixel signals: a frame of red digital image-pixel signals, a frame of green digital image-pixel signals and a frame of blue digital image-pixel signals.

Thereafter, the three frames of primary-color digital image-pixel signals are read out from the memory 46 under control of the system control circuit 32, and are then transferred to a peripheral image processing computer (not shown), through the intermediary of an interface circuit 48 and a terminal connector 50. In particular, when an image-data-transferring command signal is outputted from the peripheral image processing computer to the image reader, the three frames of primary-color digital image-pixel signals are read out, from the memory 46, and are subjected to a format-conversion processing and so on in the interface circuit 48. Then, the transfer of the three frames of primary-color digital image-pixel signals from the image reader to the peripheral image processing computer is carried out through the terminal connector 50.

Note, in FIG. 2, reference 52 indicates a switch panel on which switches for directly executing various operations of the image reader are provided.

As discussed hereinbefore, during the sensing and reading of the recorded image from the recording medium, a time of exposure, over a period of which the CCD line image sensor 28 is exposed to the light rays, should be optimally and accurately regulated before the sensed and read image can be obtained with an ideal contrast.

For a better understanding of the principle of the present invention for determining the optimal exposure time, a conventional method of determining the optimal exposure time will now be explained below.

Note, the conventional determination of the optimal exposure time can be executed in the image reader as shown in FIGS. 1 and 2, when necessary.

Prior to a regular reading-operation of a recorded image from the transparent object M, a pre-reading operation is executed to obtain a frame of digital image-pixel signals, which is temporarily stored in the memory 46. In the pre-reading operation, a time of exposure, which is relatively shorter than a time of exposure in the regular reading-operation, is selected. Note, the pre-reading operation may be executed with a rougher scan-pitch than that of the regular reading-operation.

Figure 3:
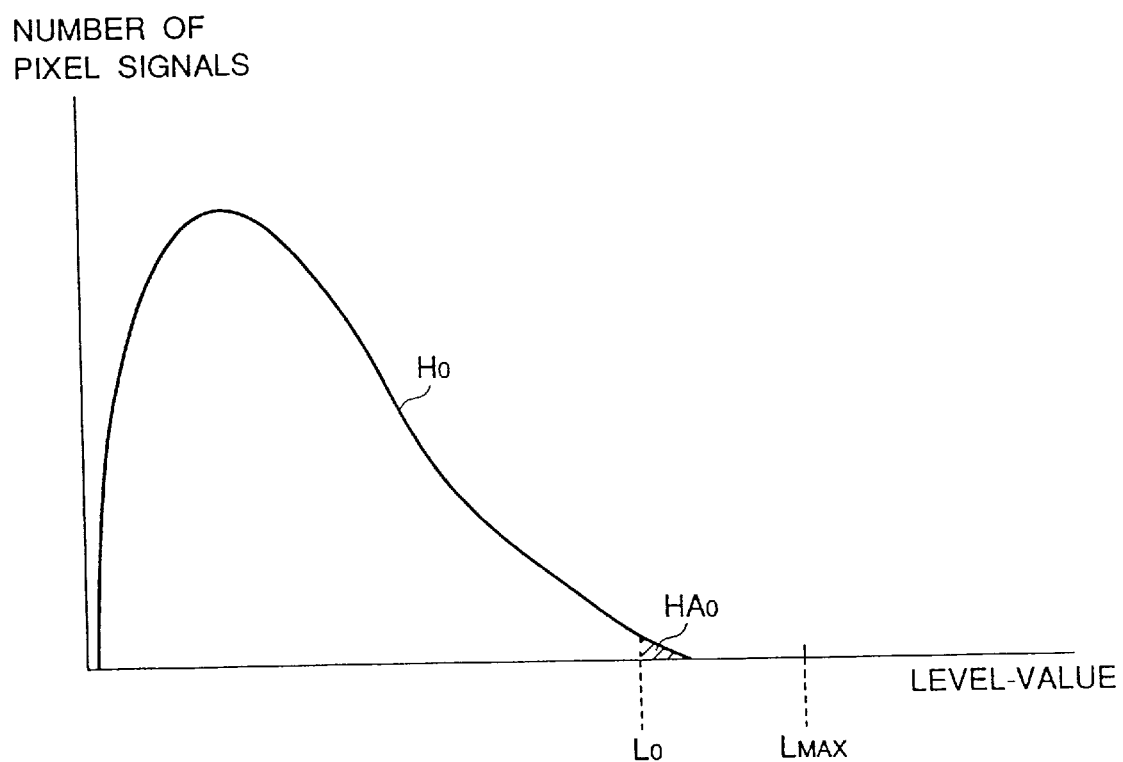
FIG. 3 is a graph showing a histogram of a frame of image-pixel signals for explaining a conventional method of determining an optimal exposure time.

Then, as shown in FIG. 3, a histogram Ho is produced on the basis of the frame of digital image-pixel signals, and is temporarily stored in the memory 46. As is well known, in the histogram $H_0$ of FIG. 3, the abscissa represents a level-value of the digital image-pixel signals included in one frame, and the ordinate represents a number of digital image-pixels having the same level-value. For example, when an analog image-pixel signal is converted into a 10-bit digital image-pixel signal by the A/D converter 42, each of the digital image-pixel signals included in one frame is classified into any one of 1,024 level-values.

Subsequently, an effective maximum level-value of the histogram $H_0$ is determined. In FIG. 3, the effective maximum level-value of the histogram $H_0$ is indicated by reference $L_0$, and may be defined as a boundary-level-value of a hatched area $HA_0$, including an actual-maximum level-value, of the histogram $H_0$, in which a number of digital image-pixel signals, corresponding to 0.5% of the total number of the digital image-pixel signals in one frame, for example, is included. Note, the digital image-pixel signals, included in the hatched area $HA_0$, are derived from the highest-transparency area of the recorded image of the transparent object M.

Figure 4:
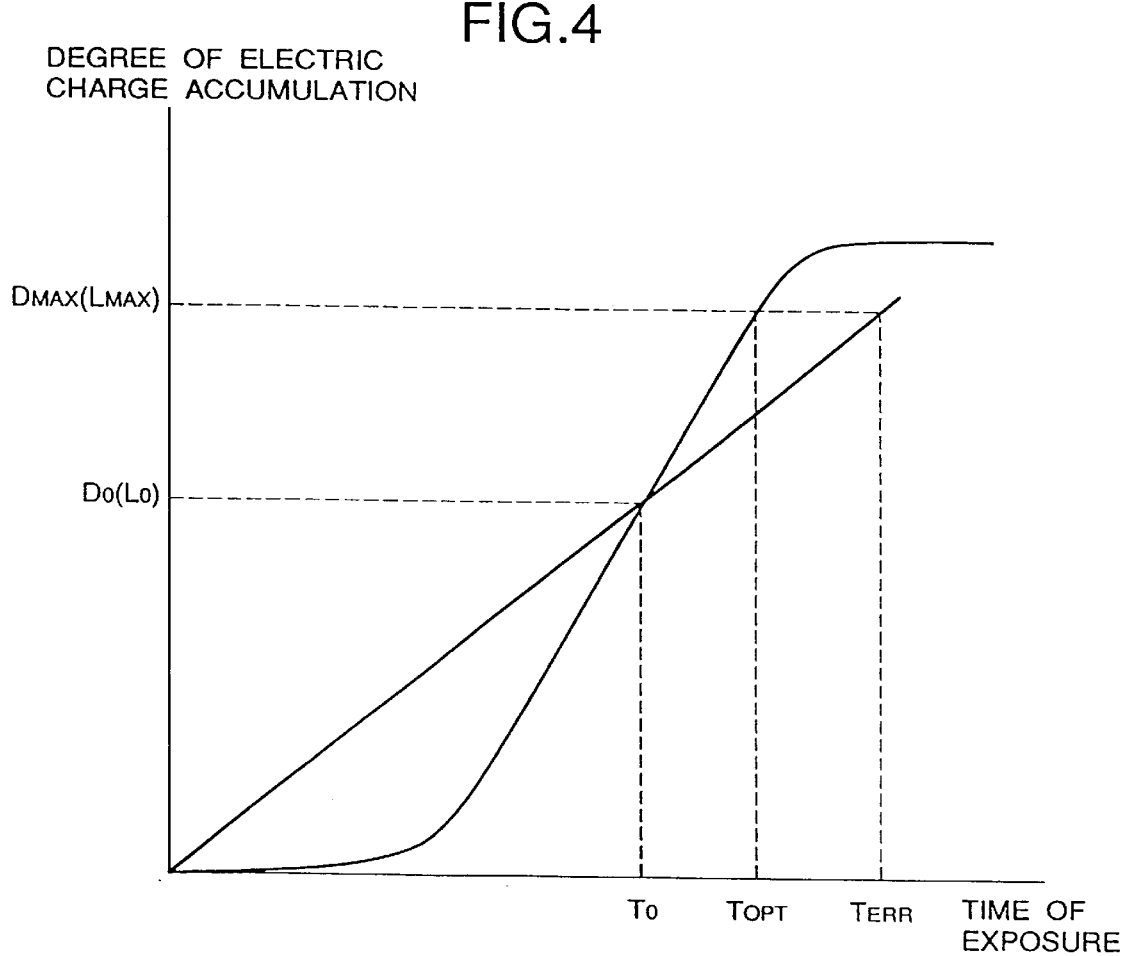
FIG. 4 is a graph showing a characteristic curve representing a relationship between a degree of electric-charge-accumulation and a time of exposure in a CCD element of a CCD line image sensor, in relation to the histogram of FIG. 3.

FIG. 4 is a graph conceptually illustrating how the optimal exposure time is determined in accordance with the conventional method. In this graph, the abscissa represents a time of electric-charge-accumulation, i.e. a time of exposure, over a period of which a specific CCD element of the CCD line image sensor 28 is exposed to the monochromatic light rays (red, green, blue), passing through the highest-transparency area of the recorded image of the transparent object M, and the ordinate represents a degree of electric charge, which is generated and accumulated in a specific CCD element of the CCD line image sensor 28.

Namely, a characteristic curve, shown in the graph of FIG. 4, represents a change in the degree of electric charge accumulation in the specific CCD element of the CCD line image sensor 28, while the specific CCD element of the CCD line image sensor 28 is exposed to the monochromatic light rays (red, green, blue), passing through the highest-transparency area of the recorded image of the transparent object M. As is apparent from the characteristic curve, as the time of exposure increases, the degree of electric charge accumulation in the specific CCD element of the CCD line image sensor 28 gradually increases, and finally becomes saturated with the generated electric charges.

In the graph of FIG. 4, reference $t_0$ indicates an exposure period, over which the CCD line image sensor 28 is exposed to the monochromatic light rays at each of the scan-steps while the pre-reading operation is executed, and reference $D_0$ indicates a degree of electric charge accumulation, which is obtained at the time when the exposure period $t_0$ is completed. Accordingly, the degree of electric charge accumulation $D_0$ corresponds to the effective maximum level-value $L_0$ (FIG. 3).

In the graph of FIG. 4, the optimal exposure period, indicated by reference $T_{OPT}$, should be determined such that a maximum degree of electric charge accumulation $D_{MAX}$ is obtained at the time when a period of the optimum exposure period $T_{OPT}$ is completed. Note, the maximum degree of electric charge accumulation $D_{MAX}$ is suitably predetermined in view of a dynamic range of the A/D converter 42 during manufacture of the image reader, and an effective maximum level-value, corresponding to the maximum degree of electric charge accumulation $D_{MAX}$, is thus indicated by reference $L_{MAX}$ in FIG. 3.

However, in accordance with the conventional determination method, an improper exposure period $T_{ERR}$ (FIG. 4) is calculated as the optimal exposure period $T_{OPT}$, because the calculation is based on an erroneous assumption that the characteristic curve of FIG. 4 exhibits a linear function. Namely, in the conventional determination method, it is assumed that the following formula can be approximately established:

$$T_{OPT} \approx (L_{MAX}/L)*t$$

However, in reality, the improper exposure period $T_{ERR}$, which seriously diverges from the optimal exposure period $T_{OPT}$, is merely obtained using the following directly proportional calculation:

$$T_{ERR}=(L_{MAX}/L)*t$$

According to a principle of the present invention for determining the optimal exposure period, prior to a regular reading-operation of a recorded image from the transparent object M, a first pre-reading operation and a second pre-reading operation are executed to obtain a first frame of digital image-pixel signals and a second frame of digital image-pixel signals, respectively, which are stored in the memory 46. In the respective first and second pre-reading operations, a first exposure period and a second exposure period are set, respectively. Namely, the first frame of digital image-pixels and the second frame of digital image-pixel signals are derived from the first exposure period and the second exposure period, respectively. The first exposure period is shorter than a time of exposure to be set in the regular reading-operation. Also, the second exposure period is longer than the first exposure period, but is shorter than the time of exposure to be set in the regular reading-operation.

Note, the first and second pre-reading operations also may be executed with rougher scan-pitches than that of the regular reading-operation.

Figure 5:
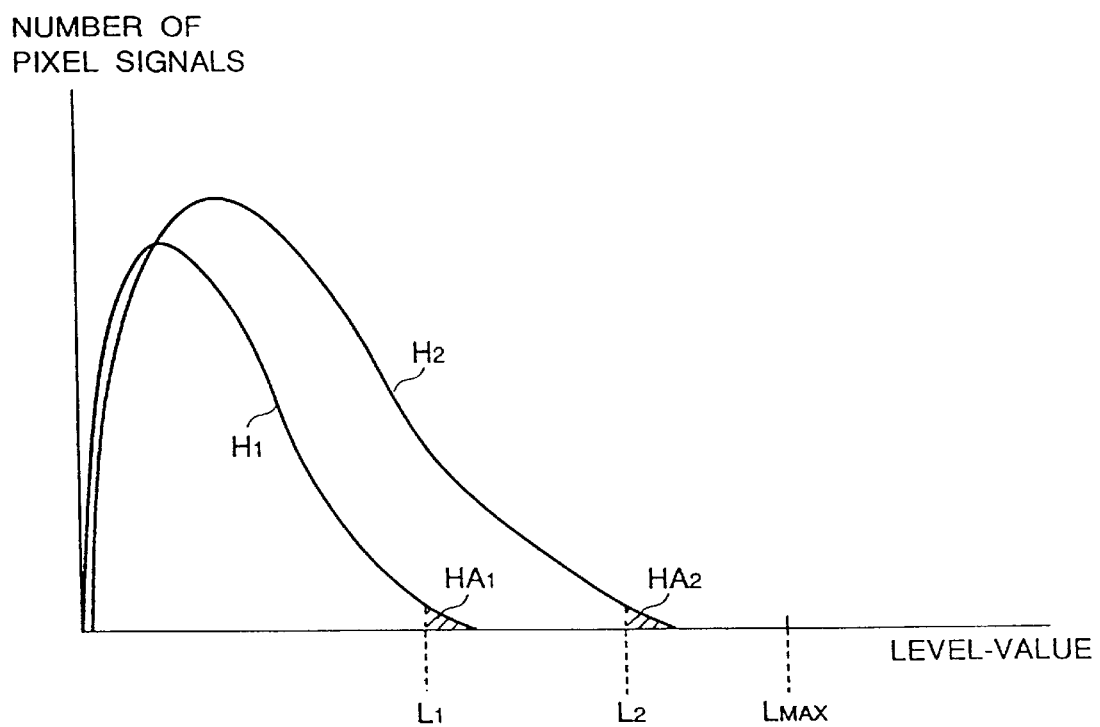
FIG. 5 is a graph showing two respective histograms of two frames of image-pixel signals, derived from two exposure periods, for explaining a principle of determination of an optimal exposure period in accordance with the present invention.

Then, as shown in FIG. 5, two histograms $H_1$ and $H_2$ are produced on the basis of the first frame of digital image-pixel signals and the second frame of digital image-pixel signals, respectively, and are stored in the memory 46. As mentioned above, since an analog image-pixel signal is converted into a 10-bit digital image-pixel signal by the A/D converter 42, each of the digital image-pixel signals included in each frame are classified into any one of 1,024 level-values.

Subsequently, a first effective maximum level-value of the digital image-pixel signals included in the first frame is determined from the first histogram $H_1$, and a second effective maximum level-value of the digital image-pixel signals included in the second frame is determined from the second histogram $H_2$. In FIG. 5, the respective first and second effective maximum level-values are indicated by references $L_1$ and $L_2$, and each effective maximum level-value ($L_1$, $L_2$) may be defined as a boundary-level-value of a corresponding hatched area ($HA_1$, $HA_2$), including an actual-maximum level-value, of the histogram ($H_1$, $H_2$), in which a number of digital image-pixel signals, corresponding to 0.5% of the total number of the digital image-pixel signals in each frame, for example, is included. Note, similar to the above-mentioned case, the digital image-pixel signals, included in each hatched area ($HA_1$, $HA_2$), are derived from the highest-transparency area of the recorded image of the transparent object M.

Figure 6:
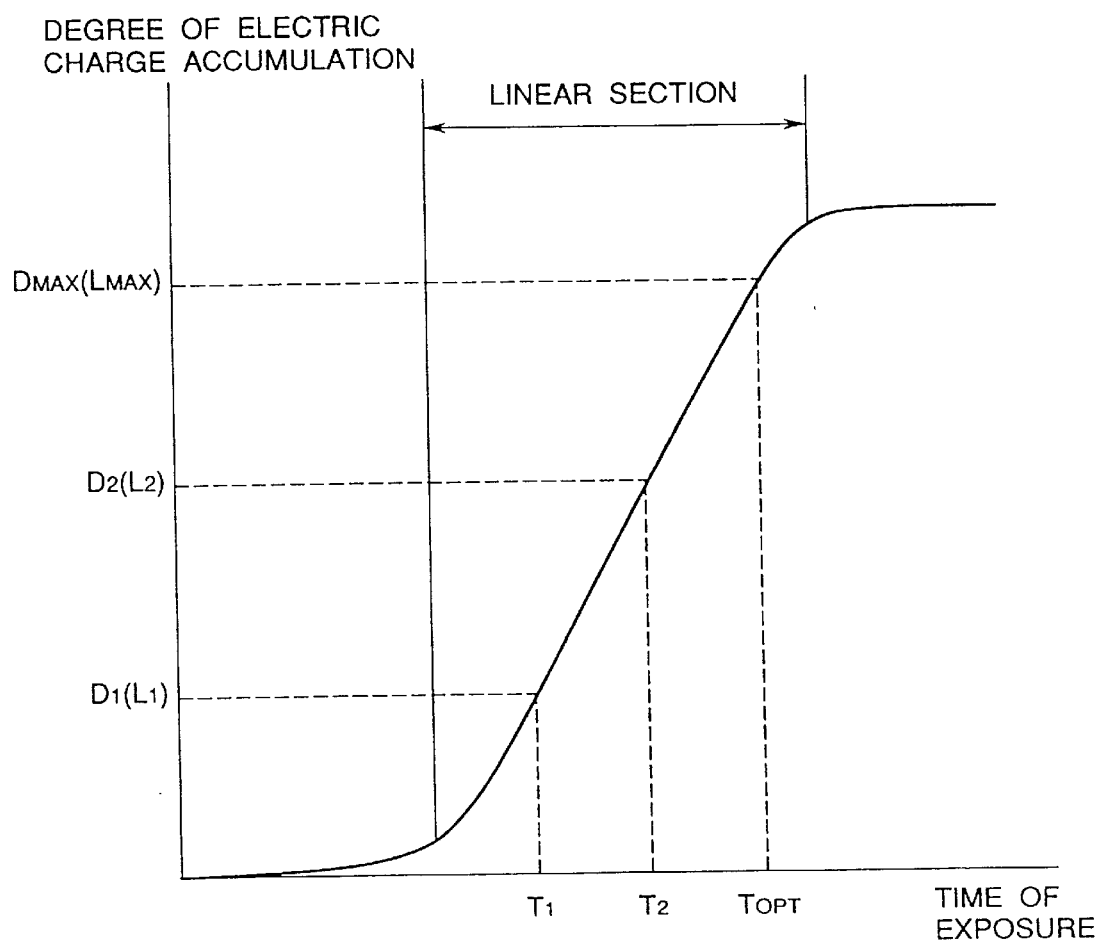
FIG. 6 is a graph showing a characteristic curve representing a relationship between a degree of electric-charge-accumulation and a time of exposure in a CCD element of a CCD line image sensor, in relation to the histograms of FIG. 5.

FIG. 6 is a graph conceptually illustrating how the optimal exposure period is determined in accordance with the principle of the present invention. This graph is essentially identical to the graph of FIG. 4. Namely, a characteristic curve, shown in the graph of FIG. 6, represents a change in the degree of electric charge accumulation in the specific CCD element of the CCD line image sensor 28, which is exposed to the monochromatic light rays (red, green, blue), passing through the highest-transparency area of the recorded image of the transparent object M.

In the graph of FIG. 6, the respective first and second exposure periods, which are set in the first and second pre-reading operations, are indicated by references $t_1$ and $t_2$. As is apparent from FIG. 6, the settings of the first and second exposure periods $t_1$ and $t_2$ are performed so that these exposure periods $t_1$ and $t_2$ are encompassed within a linear section of the characteristic curve, even though the characteristic curve may be shifted along the abscissa, due to a change in transparency of a recorded image due to a reading of another transparent object.

Similar to the above-mentioned case, a degree of electric charge accumulation $D_1$, which is obtained at the time when the exposure period $t_1$ is completed, corresponds to the first effective maximum level-value $L_1$ (FIG. 5), and a degree of electric charge accumulation $D_2$, which is obtained at the time when the exposure period $t_2$ is completed, corresponds to the second effective maximum level-value $L_2$ (FIG. 5)

In the graph of FIG. 6, the optimal exposure period $T_{OPT}$ can be accurately determined on the basis of the following proportional calculation:

$$(L_{MAX}-L_1)/(T_{OPT}-t_1)=(L_2-L_1)/(t_2-t_1)$$

Namely, this formula can be rearranged as follows:

$$T_{OPT}=[(L_{MAX}-L_1)/(L_2-L_1)]*(t_2-t_1)+t_1$$

In this rearrangement, the term "$[(L_{MAX}-L_1)/(L_2-L_1)]*(t_2-t_1)$" accurately represents the difference ($T_{OPT}-t_1$), due to the linear section of the characteristic curve of FIG. 6. Thus, the determination of the optimal exposure period $T_{OPT}$ can be accurately achieved by adding the period $t_1$ to the term "$[(L_{MAX}-L_1)/(L_2-L_1)]*(t_2-t_1)$".

Figure 7:
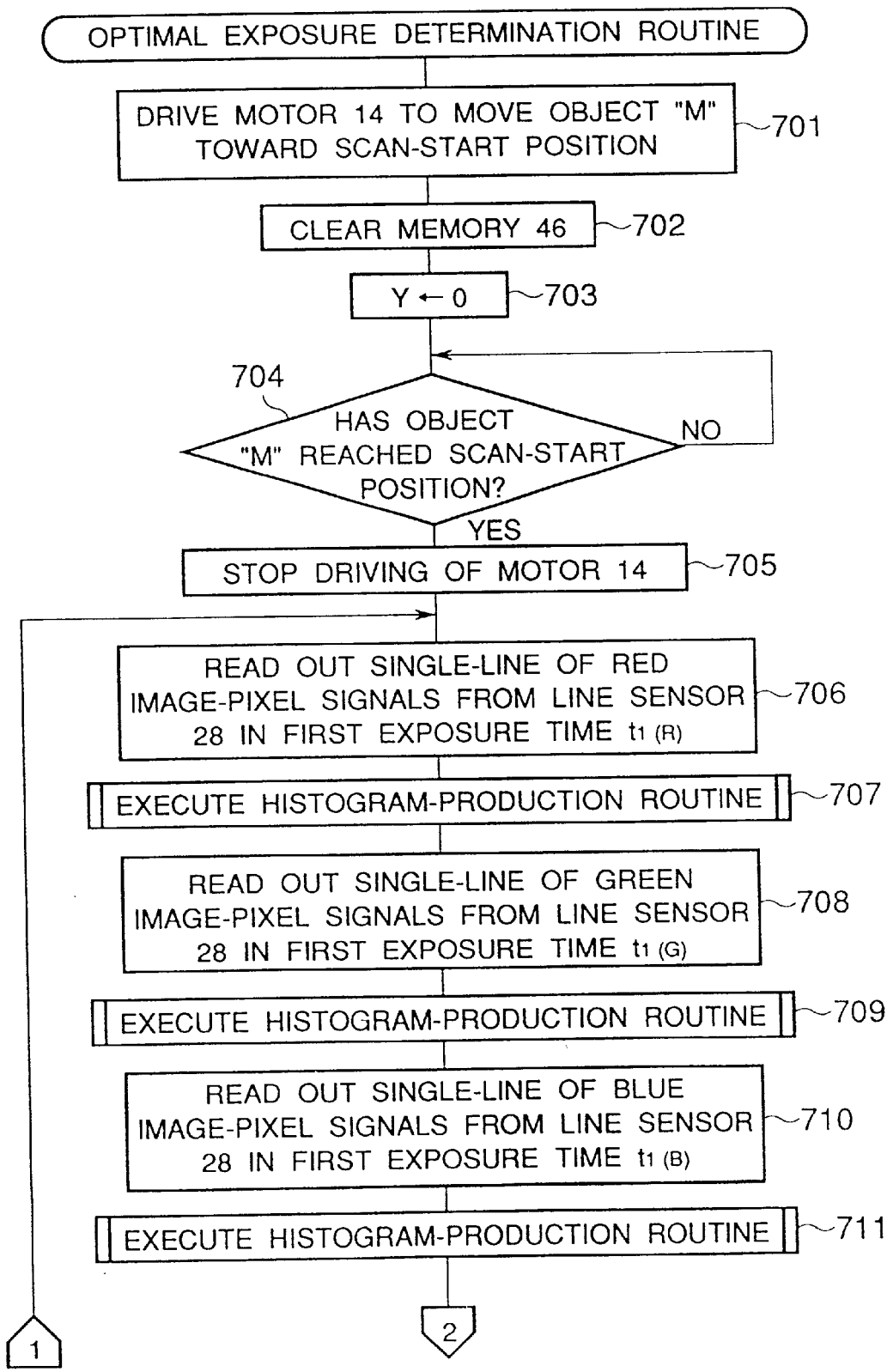
FIG. 7 is a part of a flowchart showing an optimal exposure time determination routine executed in the first embodiment of the image reader according to the present invention.
Figure 8:
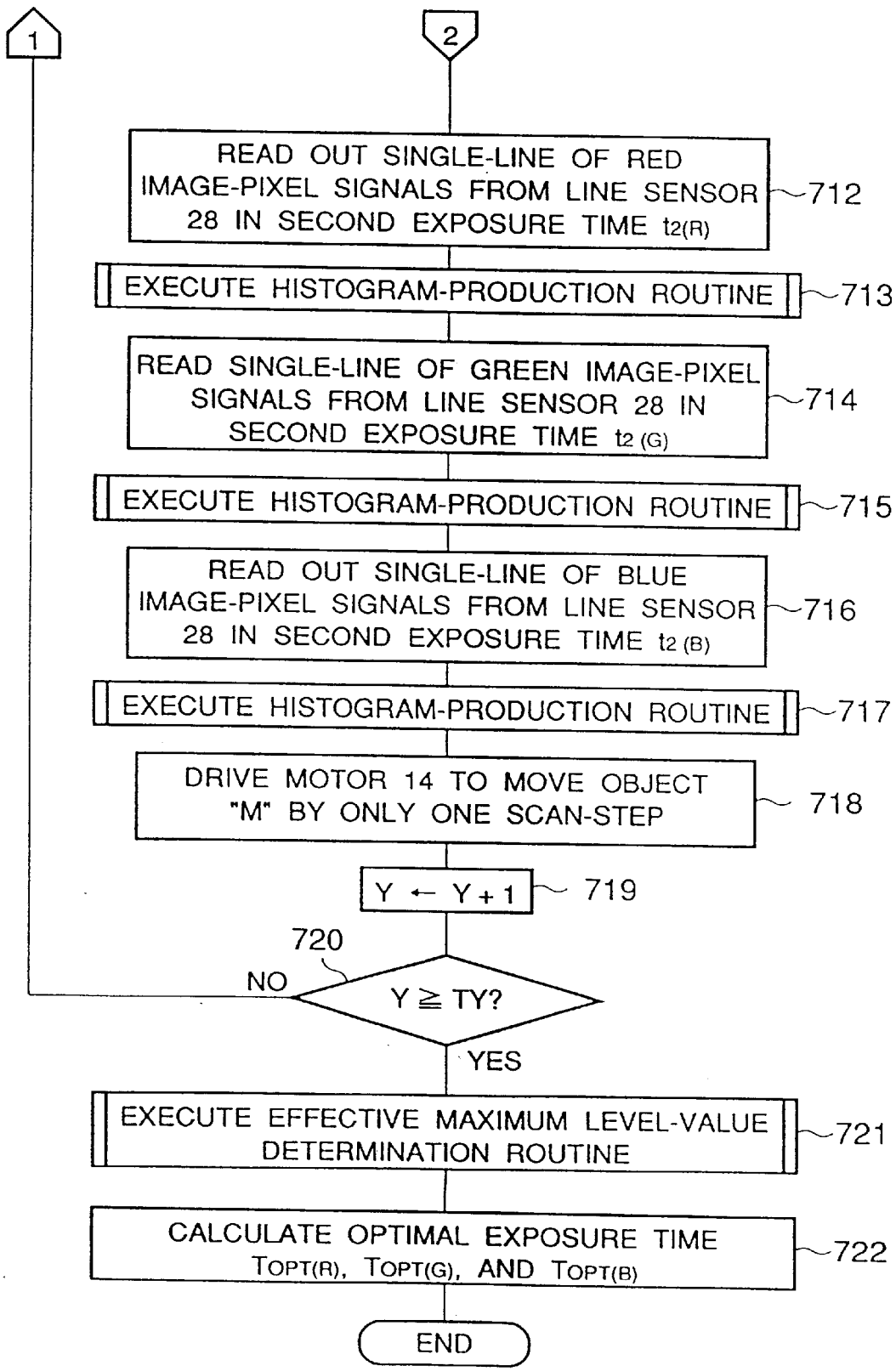
FIG. 8 is the remaining part of the flowchart showing the optimal exposure time determination routine executed in the first embodiment of the image reader according to the present invention.
Figure 9:
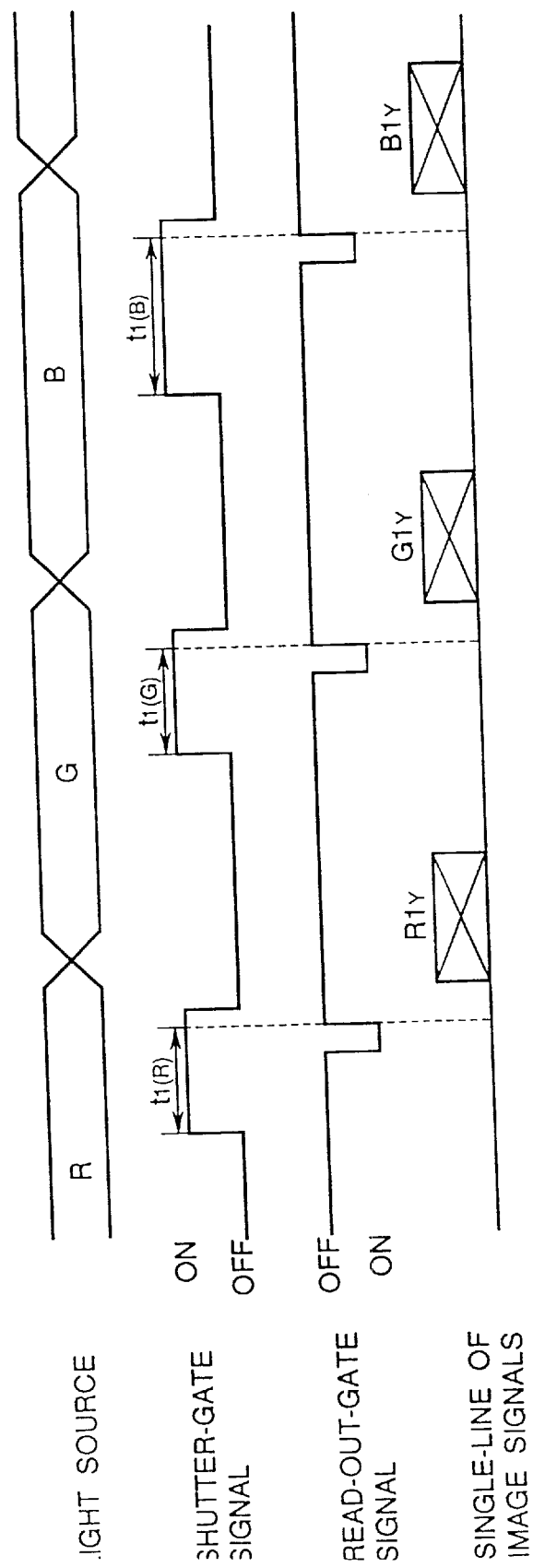
FIG. 9 is a timing chart for assisting in an explanation of the flowchart shown in FIGS. 7 and 8.
Figure 10:
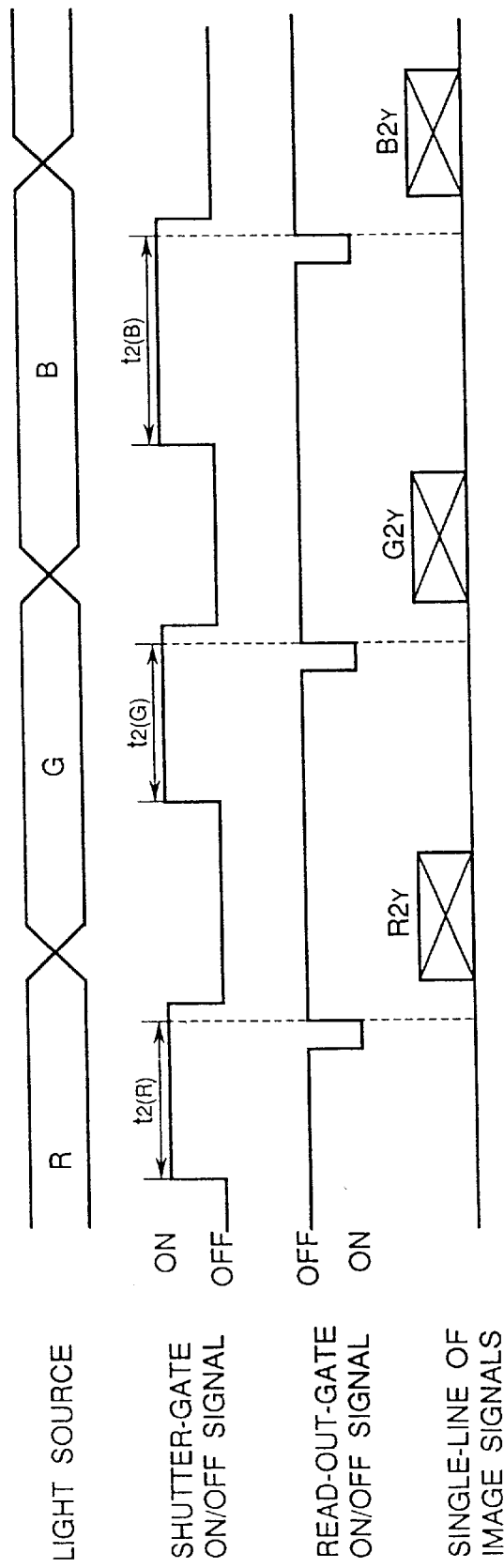
FIG. 10 is another timing chart for assisting in an explanation of the flowchart shown in FIGS. 7 and 8.

FIGS. 7 and 8 show a flowchart of a determination routine for determining an optimal exposure period, executed in the first embodiment of the image reader according to the present invention. The execution is started by turning ON a pre-reading-operation-start switch provided on the switch panel 52 after a power ON/OFF switch (not shown) of the image reader has been turned ON. Each of FIGS. 9 and 10 shows a timing chart for assisting in an explanation of the pre-reading operation routine of FIGS. 7 and 8.

At step 701, the drive motor 14 is driven to move the carriage 10, and the transparent object M, toward a scan-start position. At step 702, the memory 46 is cleared, and, at step 703, a counter Y is reset. Note, the counter Y counts a number of scanning-steps or moving-steps of the transparent object M, during a pre-reading operation of a recorded image of the transparent object M.

At step 704, it is monitored whether the transparent object M, held by the frame holder F, has reached a scan-start position. When it is confirmed that the transparent object M has reached the scan-start position, the control proceeds to step 705, in which the driving of the drive motor 14 is stopped.

At step 706, the plurality of red LED's 24R is powered ON, and the CCD line image sensor 28 is illuminated by the red-light rays, passing through the transparent object M, carrying red-image information. During the illumination of the CCD line image sensor 28 by the red-light rays, the CCD elements of the CCD line image sensor 28 are exposed to the red-light rays over a first exposure period $t_{1(R)}$, which corresponds to the first exposure period $t_1$ shown in the graph of FIG. 6, and then a single-line of red image-pixel signals $R1_Y$ is read from the CCD line image sensor 28, as shown in the timing chart of FIG. 9. The read image-pixel signals $R1_Y$ are successively converted into digital red image-pixel signals by the A/D converter 42, and the single-line of digital red image-pixel signals ($R1_Y$) is then stored in the memory 46.

In particular, after the powering-ON of the red LED's 24R, a shutter-gate signal is turned ON at a given timing, as shown in the timing chart of FIG. 9, whereby the electronic shutter of the CCD line image sensor 28 is opened, enabling the exposure of the CCD elements of the CCD line image sensor 28 to the red-light rays to be started. Namely, as soon as the shutter-gate signal is turned ON, an electric charge is started to be generated and accumulated as a red image-pixel signal in each of the CCD elements of the CCD line image sensor 28.

Then, when a read-out-gate signal is turned ON, as shown in the timing chart of FIG. 9, the single-line of red image-pixel signals $R1_Y$ is shifted from the CCD elements of the CCD line image sensor 28 to a transfer CCD path thereof. As is apparent from the timing chart of FIG. 9, when the read-out-gate signal is turned OFF, i.e. when the shifting of the single-line of red image-pixel signals $R1_Y$ from the CCD elements to the transfer CCD path thereof is completed, the first exposure period $t_{1(R)}$ ends. Just after the read-out-gate signal is turned OFF, the shutter-gate signal is also turned OFF, and thus residual electric charges are drained out from all of the CCD elements of the CCD line image sensor 28.

On the other hand, the shifted red image-pixel signals $R1_Y$ are read out from the CCD line image sensor 28, and are amplified by the amplifier 40. Then, the amplified red image-pixel signals are successively converted into digital red image-pixel signals by the A/D converter 42, and stored in the memory 46 as the single-line of digital red image-pixel signals ($R1_Y$), as already mentioned above.

Figure 11:
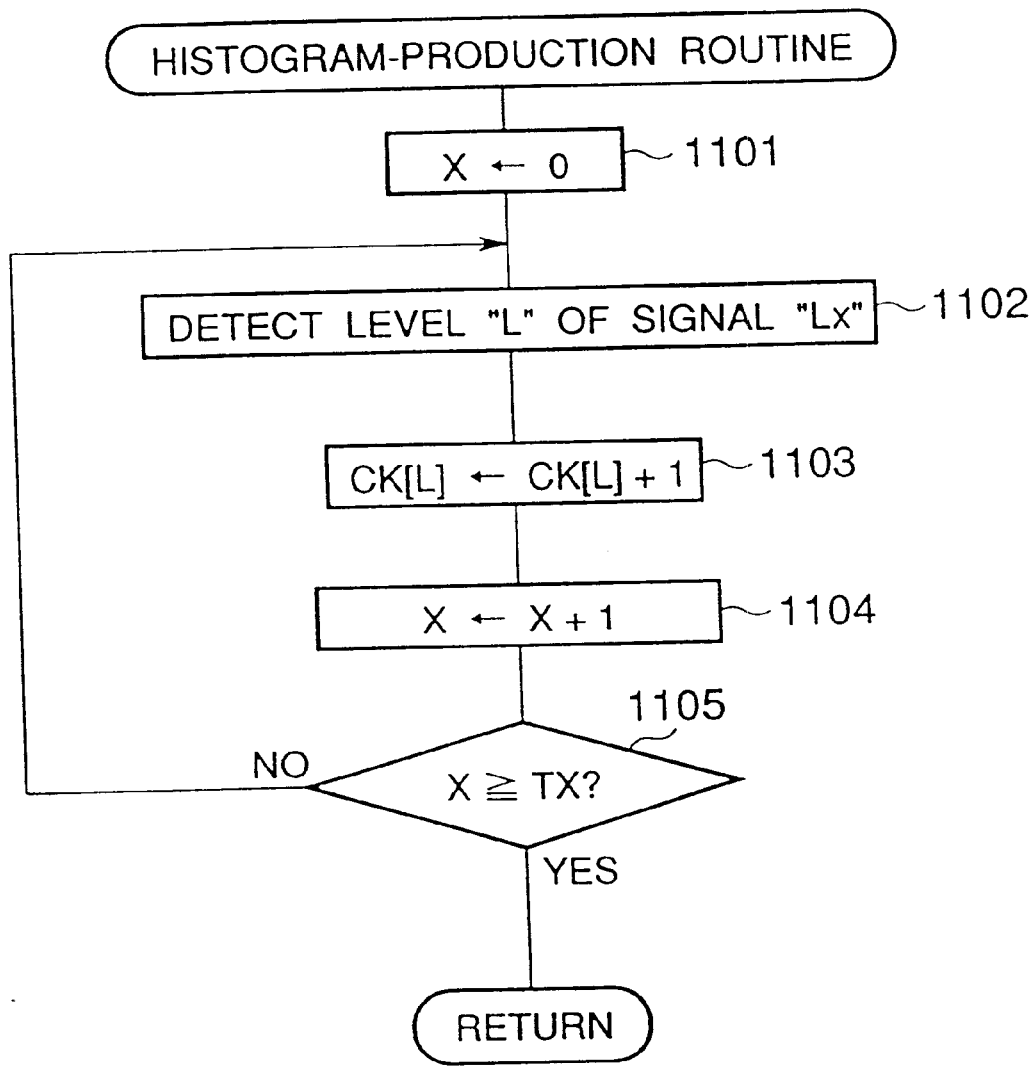
FIG. 11 is a flowchart showing a histogram-production routine executed as a sub-routine in the flowchart shown in FIGS. 7 and 8.

At step 707, a histogram-production routine, as shown in FIG. 11, is executed to partially produce a first red-histogram ($H_{1(R)}$ in FIG. 12), corresponding to the first histogram $H_1$ of FIG. 5, on the basis of the single-line of digital red image-pixel signals ($R1_Y$).

At step 708, the plurality of green LED's 24G is powered ON, and the CCD line image sensor 28 is illuminated by the green-light rays, passing through the transparent object M, carrying green-image information. During the illumination of the CCD line image sensor 28 by the green-light rays, the CCD elements of the CCD line image sensor 28 are exposed to the green-light rays over a first exposure period $t_{1(G)}$, which corresponds to the first exposure period $t_1$ shown in the graph of FIG. 6, and then a single-line of green image-pixel signals $G1_Y$ is read from the CCD line image sensor 28, as shown in the timing chart of FIG. 9. The read image-pixel signals $G1_Y$ are successively converted into digital green image-pixel signals by the A/D converter 42, and the single-line of digital green image-pixel signals ($G1_Y$) is then stored in the memory 46.

Note, the first exposure period $t_{1(G)}$ is regulated in substantially the same manner as the first exposure period $t_{1(R)}$, and the reading of the single-line of green image-pixel signals $G1_Y$ is performed in substantially the same manner as the reading of the single-line of red image-pixel signals $R1_Y$.

At step 709, the histogram-production routine, as shown in FIG. 11, is also executed to partially produce a first green-histogram ($H_{1(G)}$ in FIG. 12), corresponding to the first histogram $H_1$ of FIG. 5, on the basis of the single-line of digital green image-pixel signals ($G1_Y$).

At step 710, the plurality of blue LED's 24B is powered ON, and the CCD line image sensor 28 is illuminated by the blue-light rays, passing through the transparent object M, carrying blue-image information. During the illumination of the CCD line image sensor 28 by the blue-light rays, the CCD elements of the CCD line image sensor 28 are exposed to the blue-light rays over a first exposure period $t_{1(B)}$, which corresponds to the first exposure period $t_1$ shown in the graph of FIG. 6, and then a single-line of blue image-pixel signals $B1_Y$ is read from the CCD line image sensor 28, as shown in the timing chart of FIG. 9. The read image-pixel signals $B1_Y$ are successively converted into digital blue image-pixel signals by the A/D converter 42, and the single-line of digital blue image-pixel signals ($B1_Y$) is then stored in the memory 46.

Note, the first exposure period $t_{1(B)}$ is also regulated in substantially the same manner as the first exposure period $t_{1(R)}$, and the reading of the single-line of blue image-pixel signals $B1_Y$ is also performed in substantially the same manner as the reading of the single-line of red image-pixel signals $R1_Y$.

At step 711, the histogram-production routine, as shown in FIG. 11, is further executed to partially produce a first blue-histogram ($H_{1(B)}$ in FIG. 12), corresponding to the first histogram $H_1$ of FIG. 5, on the basis of the single-line of digital blue image-pixel signals ($B1_Y$).

At step 712, the plurality of red LED's 24R is again powered ON, and the CCD line image sensor 28 is illuminated by the red-light rays, passing through the transparent object M, carrying red-image information. During the illumination of the CCD line image sensor 28 by the red-light rays, the CCD elements of the CCD line image sensor 28 are exposed to the red-light rays over a second exposure period $t_{2(R)}$, which corresponds to the second exposure period $t_2$ shown in the graph of FIG. 6, and then a single-line of red image-pixel signals $R2_Y$ is read from the CCD line image sensor 28, as shown in the timing chart of FIG. 10. The read image-pixel signals $R2_Y$ are successively converted into digital red image-pixel signals by the A/D converter 42, and the single-line of digital red image-pixel signals ($R2_Y$) is then stored in the memory 46.

In particular, after the powering-ON of the red LED's 24R, the shutter-gate signal is turned ON at a given timing, as shown in the timing chart of FIG. 10, whereby the electronic shutter of the CCD line image sensor 28 is opened, enabling the exposure of the CCD elements of the CCD line image sensor 28 to the red-light rays to be started. Namely, as soon as the shutter-gate signal is turned ON, an electric charge is generated and accumulated as a red image-pixel signal in each of the CCD elements of the CCD line image sensor 28.

Then, when a read-out-gate signal is turned ON, as shown in the timing chart of FIG. 10, the single-line of red image-pixel signals $R2_Y$ is shifted from the CCD elements of the CCD line image sensor 28 to the transfer CCD path thereof. As is apparent from the timing chart of FIG. 10, when the read-out-gate signal is turned OFF, i.e. when the shifting of the single-line of red image-pixel signals $R2_Y$ from the CCD elements to the transfer CCD path thereof is completed, the second exposure period $t_{2(R)}$ ends. Just after the read-out-gate signal is turned OFF, the shutter-gate signal is also turned OFF, and thus residual electric charges are drained out from all of the CCD elements of the CCD line image sensor 28.

On the other hand, the shifted red image-pixel signals $R2_Y$ are read out from the CCD line image sensor 28, and are amplified by the amplifier 40. Then, the amplified red image-pixel signals are successively converted into digital red image-pixel signals by the A/D converter 42, and stored in the memory 46 as the single-line of digital red image-pixel signals ($R2_Y$), as already mentioned above.

At step 713, the histogram-production routine, as shown in FIG. 11, is executed to partially produce a second red-histogram ($H_{2(R)}$ in FIG. 12), corresponding to the second histogram $H_2$ of FIG. 5, on the basis of the single-line of digital red image-pixel signals ($R2_Y$).

At step 714, the plurality of green LED's 24G is again powered ON, and the CCD line image sensor 28 is illuminated by the green-light rays, passing through the transparent object M, carrying green-image information. During the illumination of the CCD line image sensor 28 by the green-light rays, the CCD elements of the CCD line image sensor 28 are exposed to the green-light rays over a second exposure period $t_{2(G)}$ which corresponds to the second exposure period t₂ shown in the graph of FIG. 6, and then a single-line of green image-pixel signals G2$_Y$ is read from the CCD line image sensor 28, as shown in the timing chart of FIG. 10. The read image-pixel signals G2$_Y$ are successively converted into digital green image-pixel signals by the A/D converter 42, and the single-line of digital green image-pixel signals (G2$_Y$) is then stored in the memory 46.

Note, the second exposure period $t_{2(G)}$ is regulated in substantially the same manner as the second exposure period $t_{2(R)}$, and the reading of the single-line of green image-pixel signals G2$_Y$ is performed in substantially the same manner as the reading of the single-line of red image-pixel signals R2$_Y$.

At step 715, the histogram-production routine, as shown in FIG. 11, is again executed to partially produce a second green-histogram ($H_{2(G)}$ in FIG. 12), corresponding to the second histogram H₂ of FIG. 5, on the basis of the single-line of digital green image-pixel signals (G2$_Y$).

At step 716, the plurality of blue LED's 24B is powered ON, and the CCD line image sensor 28 is illuminated by the blue-light rays, passing through the transparent object M, carrying blue-image information. During the illumination of the CCD line image sensor 28 by the blue-light rays, the CCD elements of the CCD line image sensor 28 are exposed to the blue-light rays over a second exposure period $t_{2(B)}$ which corresponds to the second exposure period t₂ shown in the graph of FIG. 6, and then a single-line of blue image-pixel signals B2$_Y$ is read from the CCD line image sensor 28, as shown in the timing chart of FIG. 10. The read image-pixel signals B2$_Y$ are successively converted into digital blue image-pixel signals by the A/D converter 42, and the single-line of digital blue image-pixel signals (B2$_Y$) is then stored in the memory 46.

Note, the second exposure period $t_{2(B)}$ is also regulated in substantially the same manner as the second exposure period $t_{2(R)}$, and the reading of the single-line of blue image-pixel signals B2$_Y$ is also performed in substantially the same manner as the reading of the single-line of red image-pixel signals R2$_Y$.

At step 717, the histogram-production routine, as shown in FIG. 11, is further executed to partially produce a second blue-histogram (H2$_{(B)}$ in FIG. 12), corresponding to the second histogram H₂ of FIG. 5, on the basis of the single-line of digital blue image-pixel signals (B2$_Y$).

At step 718, the drive motor 14 is driven to advance the carriage 10, and therefore the transparent object M, by one scan-step. Then, at step 719, the counter Y is incremented by one, and the control proceeds to step 720, in which it is determined whether a count number of the counter Y has reached TY. Note, "TY" represents a total number of scan-steps which is necessary for completely reading the recorded image of the transparent object M in the pre-reading operation, and the total scan-steps TY may be previously set and stored in the ROM of the system control circuit 32.

If Y<TY, the control returns from step 720 to step 706, and the routine comprising steps 706 to 720 is repeatedly executed until the count number of the counter Y reaches TY. At step 720, when the count number of the counter Y has reached TY, i.e. when the pre-reading operation is completed, the control proceeds from step 720 to step 721.

Note, at this stage, the production of the first and second red-histograms ($H_{1(R)}$ and $H_{2(R)}$) based on all of the single-lines of the digital red image-pixel signals R1$_Y$ and the production of the first and second green-histograms ($H_{1(G)}$ and $H_{2(G)}$) based on all of the single-lines of digital green image-pixel signals G1$_Y$ and G2$_Y$, and the production of the first and second blue-histograms ($H_{1(B)}$ and $H_{2(B)}$) based on all of the single-lines of digital blue image-pixel signals B1$_Y$ and B2$_Y$ have been completed.

Figure 13:
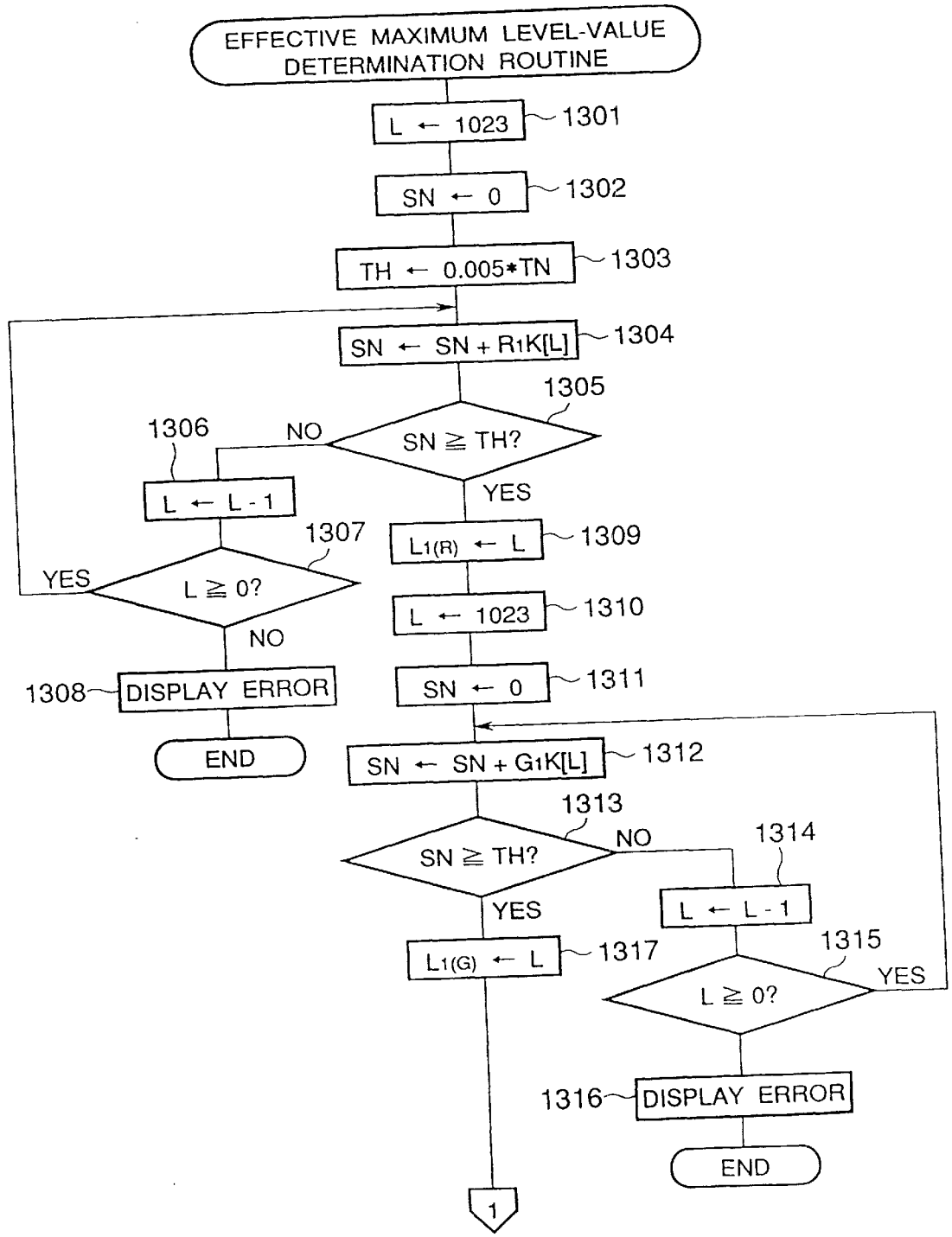
FIG. 13 is a part of a flowchart showing an effective maximum level-value determination routine executed as a subroutine in the flowchart of FIGS. 7 and 8.
Figure 14:
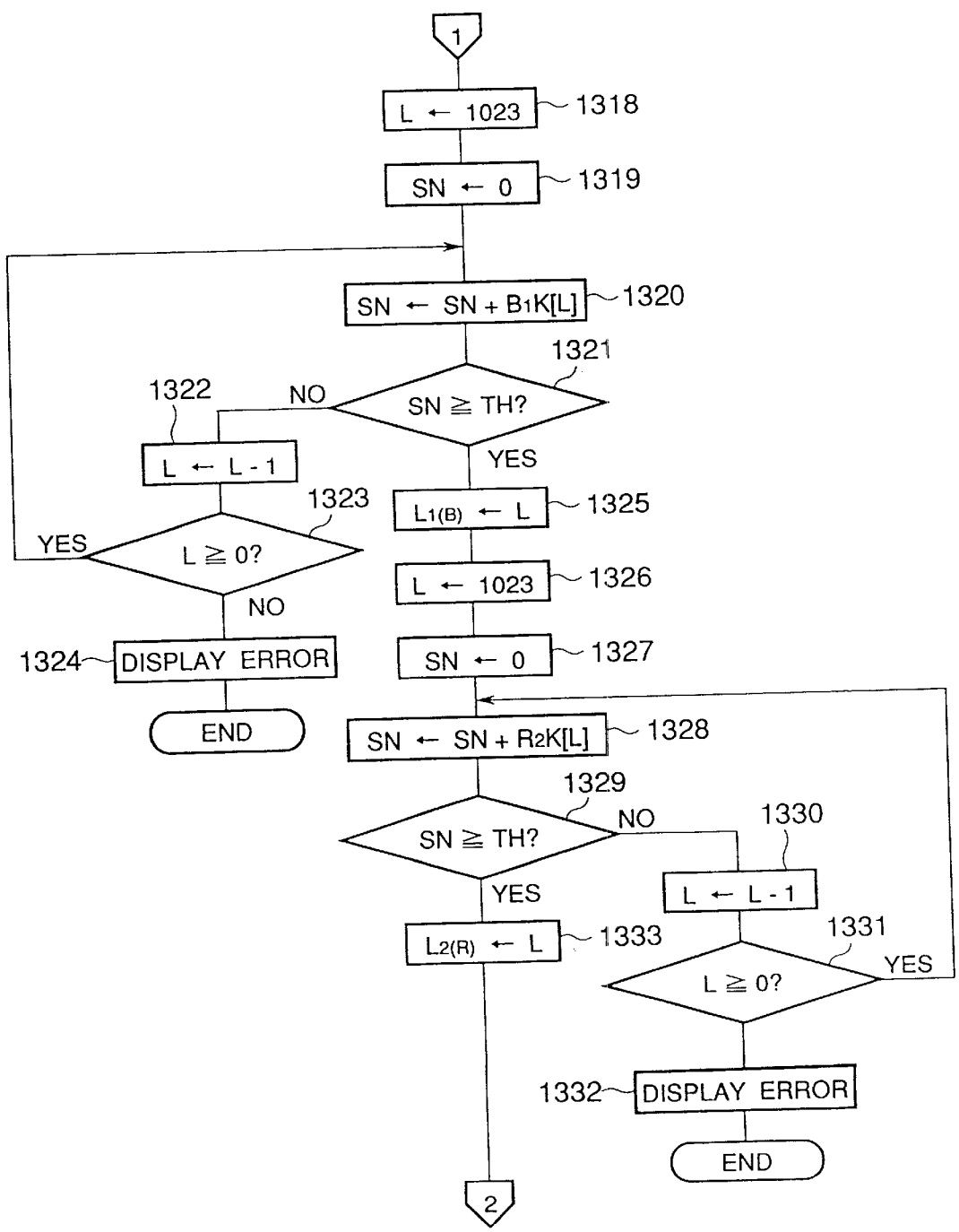
FIG. 14 is another part of the flowchart showing the effective maximum level-value determination routine executed as the sub-routine in the flowchart of FIGS. 7 and 8.
Figure 15:
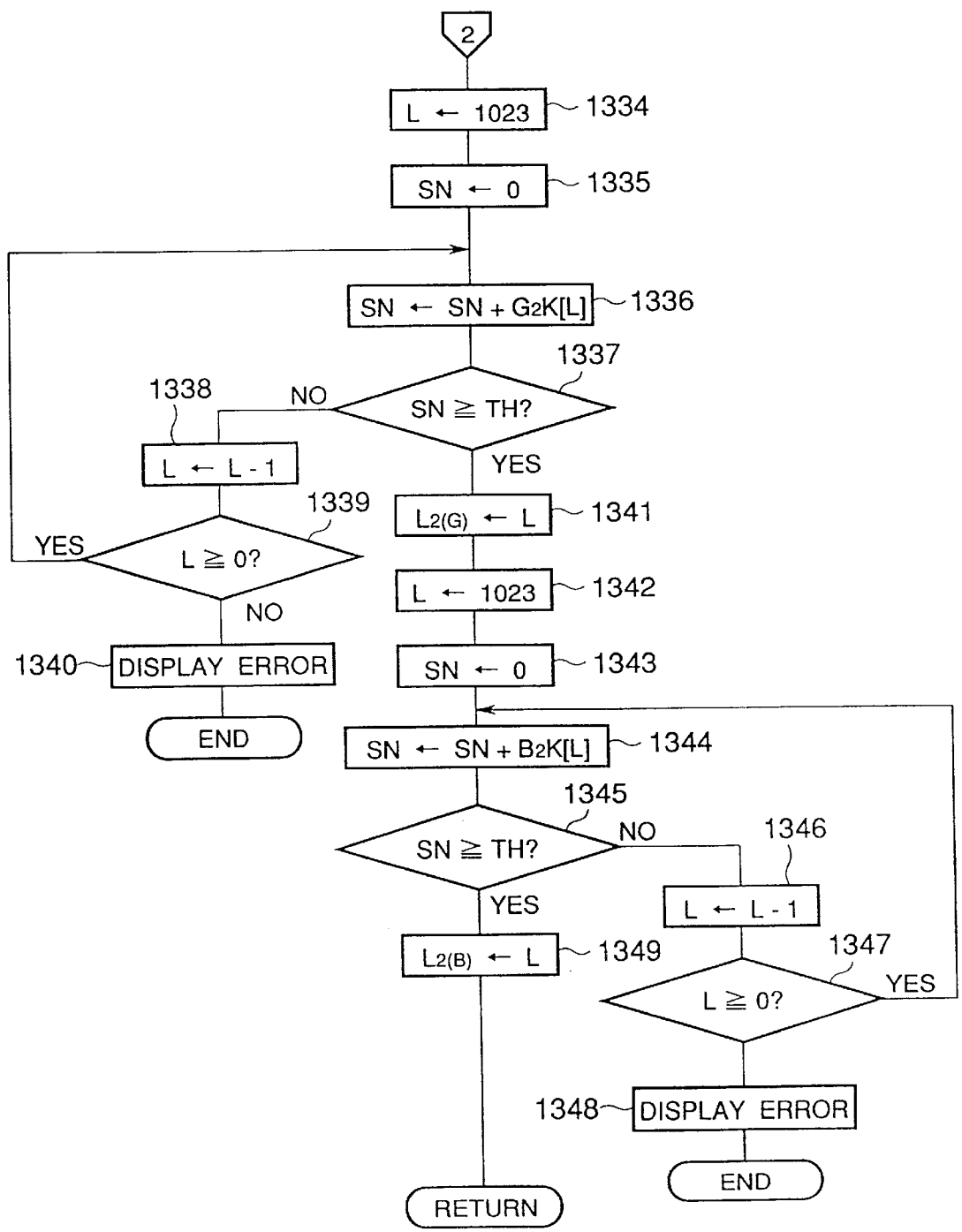
FIG. 15 is the remaining part of the flowchart showing the effective maximum level-value determination routine executed as the sub-routine in the flowchart of FIGS. 7 and 8.

At step 721, an effective maximum level-value determination routine, as shown in FIGS. 13 to 15, is executed, whereby an effective maximum level-value is determined from each of the above-mentioned histograms. Namely, respective effective maximum level-values $L_{1(R)}$, $L_{1(G)}$ and $L_{1(B)}$, each of which corresponds to L₁ of FIG. 5, are obtained from the first red-histogram ($H_{1(R)}$), first green-histogram ($H_{1(G)}$) and first blue-histogram ($H_{1(B)}$), and respective effective maximum level-values $L_{2(R)}$, $L_{2(G)}$ and $L_{2(B)}$, each of which corresponds to L₂ of FIG. 5, are obtained from the second red-histogram ($H_{2(R)}$), second green-histogram ($H_{2(G)}$) and second blue-histogram ($H_{2(B)}$)

Then, at step 722, optimal exposure periods $T_{OPT(R)}$, $T_{OPT(G)}$ and $T_{OPT(B)}$ are calculated from the following formulas:

$$T_{OPT(R)} \leftarrow [(L_{MAX(R)} + L_{1(R)})/(L_{2(R)} - L_{1(R)})]*(t_{2(R)} - t_{1(R)}) + t_{1(R)}$$

$$T_{OPT(G)} \leftarrow [(L_{MAX(G)} + L_{1(G)})/(L_{2(G)} - L_{1(G)})]*(t_{2(G)} - t_{1(G)}) + t_{1(G)}$$

$$T_{OPT(B)} \leftarrow [(L_{MAX(B)} + L_{1(B)})/(L_{2(B)} - L_{1(B)})]*(t_{2(B)} - t_{1(B)}) + t_{1(B)}$$

Herein: Each of $L_{MAX(R)}$, $L_{MAX(G)}$ and $L_{MAX(B)}$ corresponds to $L_{MAX}$ of FIG. 5.

Note, $L_{MAX(R)}$, $L_{MAX(G)}$, and $L_{MAX(B)}$ are suitably predetermined in view of the dynamic range of the A/D converter 42, and may be previously stored in the ROM of the system control circuit 32.

The calculated results, i.e. the optimal exposure periods $T_{OPT(R)}$, $T_{OPT(G)}$ and $T_{OPT(B)}$, are stored in the RAM of the system control circuit 32, and are used when a regular reading operation is executed in the image reader.

With reference to FIG. 11, the histogram-production routine, executed in each of steps 707, 709, 711, 713, 715 and 717 of the flowchart of FIGS. 7 and 8, will now be explained below.

Prior to the explanation of the histogram-production routine, the following matters are confirmed for assisting in the explanation:

1) A single-line of monochromatic (red, green, blue) image-pixel signals, read from the CCD line image sensor 28, is converted into a single-line of digital monochromatic image-pixel signals by the A/D converter 42, and these digital monochromatic image-pixel signals included in one single-line are stored in the memory 46.

2) Each of the digital monochromatic image-pixel signals is classified into any one of the 1,024 level-values due to the conversion of the analog image-pixel signal into the 10-bit digital image-pixel signal by the A/D converter 42, as already mentioned above.

3) As conceptually shown in FIG. 12, the first red-histogram, indicated by reference $H_{1(R)}$, is stored in areas defined by addresses "0000" to "1023" of the memory 46;

the first green-histogram, indicated by reference $H_{1(G)}$, is stored in areas defined by addresses "1024" to "2047" of the memory 46;

the first blue-histogram, indicated by reference $H_{1(B)}$, is stored in areas defined by addresses "2048" to "3071" of the memory 46;

the second red-histogram, indicated by reference $H_{2(R)}$, is stored in areas defined by addresses "3072" to "4095" of the memory 46;

the second green-histogram, indicated by reference $H_{2(G)}$, is stored in areas defined by addresses "4096" to "5119" of the memory 46; and the second blue-histogram, indicated by reference $H_{2(B)}$, is stored in areas defined by addresses "5120" to "6143" of the memory 46.

4) A histogram-production counter $R_1K[L]$ is defined in each of the addresses "0000" to "1023", and is used to count a number of digital red image-pixel signals having the same level-value L;

a histogram-production counter $G_1K[L]$ is defined in each of the addresses "1024" to "2047", and is used to count a number of digital green image-pixel signals having the same level-value L;

a histogram-production counter $B_1K[L]$ is defined in each of the addresses "2048" to "3071", and is used to count a number of digital blue image-pixel signals having the same level-value L;

a histogram-production counter $R_2K[L]$ is defined in each of the addresses "3072" to "4095", and is used to count a number of digital red image-pixel signals having the same level-value L;

a histogram-production counter $G_2K[L]$ is defined in each of the addresses "4096" to "5119", and is used to count a number of digital green image-pixel signals having the same level-value L; and a histogram-production counter $B_2K[L]$ is defined in each of the addresses "5120" to "6143", and is used to count a number of digital blue image-pixel signals having the same level-value L.

5) A level-value L of a digital monochromatic image-pixel signal is represented by any one of [L=0000] to [L=1023].

At step 1101, a counter X is reset. The counter X is used to count a number of the digital monochromatic image-pixel signals (red, green, blue) included in one single-line. Then, at step 1102, a level-value L is detected with respect to one ($L_X$) of the digital monochromatic image-pixel signals included in one single-line. Note, the level-value L represents one of the 1,024 level-values.

At step 1103, a count number of a histogram-production counter CK[L], representing any one of $R_1K[L]$, $G_1K[L]$, $B_1K[L]$, $R_2K[L]$, $G_2K[L]$ and $B_2K[L]$, is incremented by one. Then, at step 1104, the count number of the counter X is incremented by one. Subsequently, at step 1105, it is determined whether the count number of the counter X has reached TX. Note, "TX" represents a total number of the digital monochromatic image-pixel signals included in one single-line, which is equal to the total number of the CCD elements of the CCD line image sensor 28, and which may be previously set and stored in the ROM of the system control circuit 32.

If X<TX, the control returns from step 1105 to step 1102, and the routine comprising steps 1102 to 1105 is repeatedly executed until the count number of the counter X reaches TX. At step 1105, when the count number of the counter X has reached TX, i.e. when a partial production of a histogram based on the single-line of the digital monochromatic image-pixel signals is completed, the control returns to one of steps 708, 710, 712, 714, 716 and 718 of the flowchart of FIGS. 7 and 8.

With reference to FIGS. 13 to 15, the effective maximum level-value determination routine, executed in step 721 of the flowchart of FIGS. 7 and 8, will now be explained below.

At step 1301, a level-value L, representing any one of [0000] to [1023], is set to the maximum level-value [1023], and, at step 1302, an image-pixel-signal-number parameter SN, representing a number of digital monochromatic image-pixel signals, is initialized as 0.

At step 1303, a threshold value TH is set by the following calculation:

$$TH \rightarrow 0.005*TN$$

Herein, TN indicates a total number of digital monochromatic image-pixel signals included in one frame. Namely, a number of digital monochromatic image-pixel signals, corresponding to 0.5% of the total number TN of the digital monochromatic image-pixel signals in one frame, is set as the threshold value TH.

At step 1304, the following calculation is executed:

$$SN \leftarrow SN + R_1K[L=1023]$$

Beginning at the very highest level (L=1023), the SN counter is incremented by the number of pixels that were counted in the L-level $R_1K$ histogram-production counter until enough cumulative (0.5%) high-level pixels are counted from the highest level histogram-production counters (L=1023, 1022, 1021 . . . ). Then, at step 1305, it is determined whether the image-pixel-signal-number parameter SN is equal to or more than the threshold value TH.

If SN<TH, the control proceeds from step 1305 to step 1306, in which the level-value L is decremented by one. Then, at step 1307, it is determined whether the level value L is greater than or equal to the minimum level-value [0000]. At this stage, since L=1023, the control returns from step 1307 to step 1304. Namely, the routine comprising steps 1304 to 1307 is repeatedly executed until the image-pixel-signal-number parameter SN reaches or exceeds the threshold value TH.

At step 1305, when SN≧TH, the control proceeds from step 1305 to step 1309, in which the level-value L, obtained at this stage, is stored, as the effective maximum level-value $L_{1(R)}$ of the first red-histogram $H_{1(R)}$, in the RAM of the system control circuit 32.

On the other hand, at step 1307, if it is determined that the level-value L is less than the minimum level-value [0000] during the execution of the routine comprising steps 1304 to 1307, without the image-pixel-signal-number parameter SN reaching or exceeding the threshold value TH, the first red-histogram $H_{1(R)}$ has been abnormally produced. In this case, the control proceeds from step 1307 to step 1308, in which an error message, announcing that the pre-reading operation should be repeated, is displayed on, for example, an LCD (liquid crystal display) panel (not shown) provided on the image reader.

At step 1310, the level-value L is again set to be the maximum level-value [1023], and, at step 1311, the image-pixel-signal-number parameter SN is reset to 0.

At step 1312, the following calculation is executed:

$$SN \leftarrow SN + G_1K[L=1023]$$

Then, at step 1313, it is determined whether the image-pixel-signal-number parameter SN is equal to or more than the threshold value TH.

If SN<TH, the control proceeds from step 1313 to step 1314, in which the level-value L is decremented by one. Then, at step 1315, it is determined whether the level value L is equal to or more than the minimum level-value [0000]. At this stage, since L=1023, the control returns from step 1315 to step 1312. Namely, the routine comprising steps 1312 to 1315 is repeatedly executed until the image-pixel-signal-number parameter SN reaches or exceeds the threshold value TH.

At step 1313, if SN≧TH, the control proceeds from step 1313 to step 1317, in which the level-value L, obtained at this stage, is stored, as the effective maximum level-value $L_{1(G)}$ of the first green-histogram $H_{1(G)}$, in the RAM of the system control circuit 32.

Similar to the above mentioned case, at step 1315, if it is determined that the level-value L is less than the minimum level-value [0000] during the execution of the routine comprising steps 1312 to 1315, without the image-pixel-signal-number parameter SN reaching or exceeding the threshold value TH, the first green-histogram $H_{1(G)}$ has been abnormally produced. Accordingly, the control proceeds from step 1315 to step 1316, in which the error message, announcing that the pre-reading operation should be repeated, is displayed on the LCD panel of the image reader.

At step 1318, the level-value L is again set to the maximum level-value [1023], and, at step 1319, the image-pixel-signal-number parameter SN is again reset to 0.

At step 1320, the following calculation is executed:

$$SN \leftarrow SN + B_1 K[L=1023]$$

Then, at step 1321, it is determined whether the image-pixel-signal-number parameter SN is equal to or more than the threshold value TH.

If SN<TH, the control proceeds from step 1321 to step 1322, in which the level-value L is decremented by one. Then, at step 1323, it is determined whether the level value L is equal to or more than the minimum level-value [0000]. At this stage, since L=1023, the control returns from step 1323 to step 1320. Namely, the routine comprising steps 1320 to 1323 is repeatedly executed until the image-pixel-signal-number parameter SN reaches or exceeds the threshold value TH.

At step 1321, if SN≧TH, the control proceeds from step 1321 to step 1325, in which the level-value L, obtained at this stage, is stored, as the effective maximum level-value $L_{1(B)}$ of the first blue-histogram $H_{1(B)}$, in the RAM of the system control circuit 32.

However, at step 1323, if it is determined that the level-value L is less than the minimum level-value [0000] during the execution of the routine comprising steps 1320 to 1323, without the image-pixel-signal-number parameter SN reaching or exceeding the threshold value TH, the first blue-histogram $H_{1(B)}$ has been abnormally produced. Accordingly, the control proceeds from step 1323 to step 1324, in which the error message, announcing that the pre-reading operation should be repeated, is displayed on the LCD panel of the image reader.

At step 1326, the level-value L is set to the maximum level-value [1023], and, at step 1327, the image-pixel-signal-number parameter SN is initialized as 0.

At step 1328, the following calculation is executed:

$$SN \leftarrow SN + R_2 K[L=1023]$$

Then, at step 1329, it is determined whether the image-pixel-signal-number parameter SN is equal to or more than the threshold value TH.

If SN<TH, the control proceeds from step 1329 to step 1330, in which the level-value L is decremented by one. Then, at step 1331, it is determined whether the level value L is equal to or more than the minimum level-value [0000]. At this stage, since L=1023, the control returns from step 1331 to step 1328. Namely, the routine comprising steps 1328 to 1331 is repeatedly executed until the image-pixel-signal-number parameter SN reaches or exceeds the threshold value TH.

At step 1329, if SN≧TH, the control proceeds from step 1329 to step 1333, in which the level-value L, obtained at this stage, is stored, as the effective maximum level-value $L_{2(R)}$ of the second red-histogram $H_{2(R)}$, in the RAM of the system control circuit 32.

However, at step 1331, if it is determined that the level-value L is less than the minimum level-value [0000] during the execution of the routine comprising steps 1328 to 1331, without the image-pixel-signal-number parameter SN reaching or exceeding the threshold value TH, the second red-histogram $L_{2(R)}$ has been abnormally produced. Accordingly, the control proceeds from step 1331 to step 1332, in which the error message, announcing that the pre-reading operation should be repeated, is displayed on the LCD panel of the image reader.

At step 1334, the level-value L is reset to the maximum level-value [1023], and, at step 1335, the image-pixel-signal-number parameter SN is again initialized as 0.

At step 1336, the following calculation is executed:

$$SN \leftarrow SN + G_2 K[L=1023]$$

Then, at step 1337, it is determined whether the image-pixel-signal-number parameter SN is equal to or more than the threshold value TH.

If SN<TH, the control proceeds from step 1337 to step 1338, in which the level-value L is decremented by one. Then, at step 1339, it is determined whether the level value L is equal to or more than the minimum level-value [0000]. At this stage, since L=1023, the control returns from step 1339 to step 1336. Namely, the routine comprising steps 1336 to 1339 is repeatedly executed until the image-pixel-signal-number parameter SN reaches or exceeds the threshold value TH.

At step 1337, if SN≧TH, the control proceeds from step 1337 to step 1341, in which the level-value L, obtained at this stage, is stored, as the effective maximum level-value $L_{2(G)}$ of the second green-histogram $H_{2(G)}$, in the RAM of the system control circuit 32.

However, at step 1339, if it is determined that the level-value L is less than the minimum level-value [0000] during the execution of the routine comprising steps 1336 to 1339, without the image-pixel-signal-number parameter SN reaching or exceeding the threshold value TH, the second green-histogram $H_{2(G)}$ has been abnormally produced. Accordingly, the control proceeds from step 1339 to step 1340, in which the error message, announcing that the pre-reading operation should be repeated, is displayed on the LCD panel of the image reader.

At step 1342, the level-value L is set to the maximum level-value [1023], and, at step 1343, the image-pixel-signal-number parameter SN is initialized as 0.

At step 1344, the following calculation is executed:

$$SN \leftarrow SN + B_2 K[L=1023]$$

Then, at step 1345, it is determined whether the image-pixel-signal-number parameter SN is equal to or more than the threshold value TH.

If SN<TH, the control proceeds from step 1345 to step 1346, in which the level-value L is decremented by one. Then, at step 1347, it is determined whether the level value L is equal to or more than the minimum level-value [0000]. At this stage, since L=1023, the control returns from step 1347 to step 1344. Namely, the routine comprising steps 1344 to 1347 is repeatedly executed until the image-pixel-signal-number parameter SN reaches or exceeds the threshold value TH.

At step 1345, if SN≧TH, the control proceeds from step 1345 to step 1349, in which the level-value L, obtained at this stage, is stored, as the effective maximum level-value $L_{2(B)}$ of the second blue-histogram $H_{2(B)}$, in the RAM of the system control circuit 32.

However, at step 1347, if it is determined that the level-value L is less than the minimum level-value [0000] during the execution of the routine comprising steps 1344 to 1347, without the image-pixel-signal-number parameter SN reaching or exceeding the threshold value TH, the second blue-histogram $H_{2(B)}$ has been abnormally produced. Accordingly, the control proceeds from step 1347 to step 1348, in which the error message, announcing that the pre-reading operation should be repeated, is displayed on the LCD panel of the image reader.

After the determination of the effective maximum level-values $L_{1(R)}$, $L_{1(G)}$, $L_{1(B)}$, $L_{2(R)}$, $L_{2(G)}$ and $L_{2(B)}$ is completed, the control returns to step 722 of the flowchart of FIGS. 7 and 8, in which the exposure periods $T_{OPT(R)}$, $T_{OPT(G)}$ and $T_{OPT(B)}$ are calculated as mentioned above.

Figure 16:
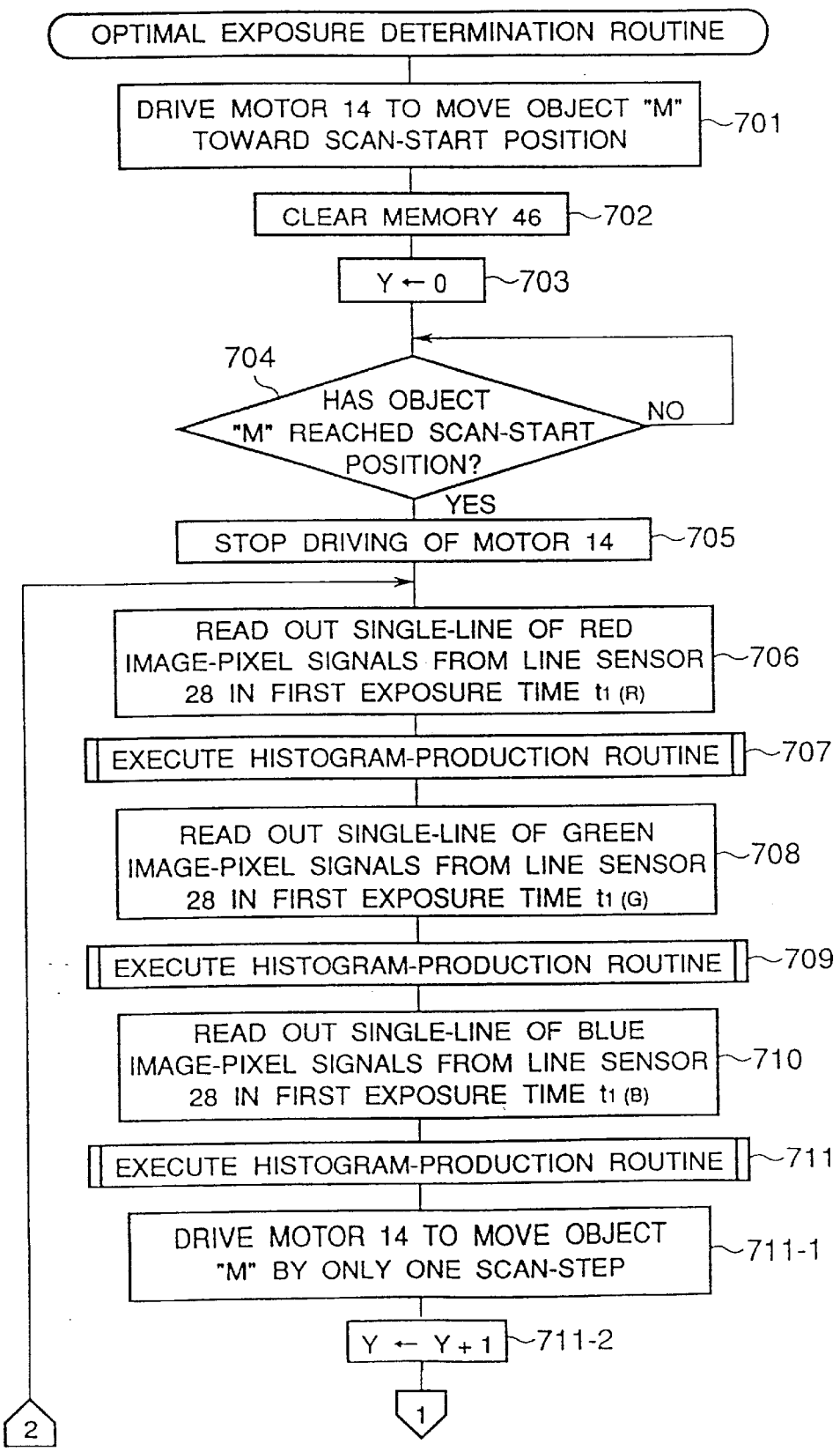
FIG. 16 is a part of a flowchart showing a modification of the optimal exposure time determination routine shown in FIGS. 7 and 8.
Figure 17:
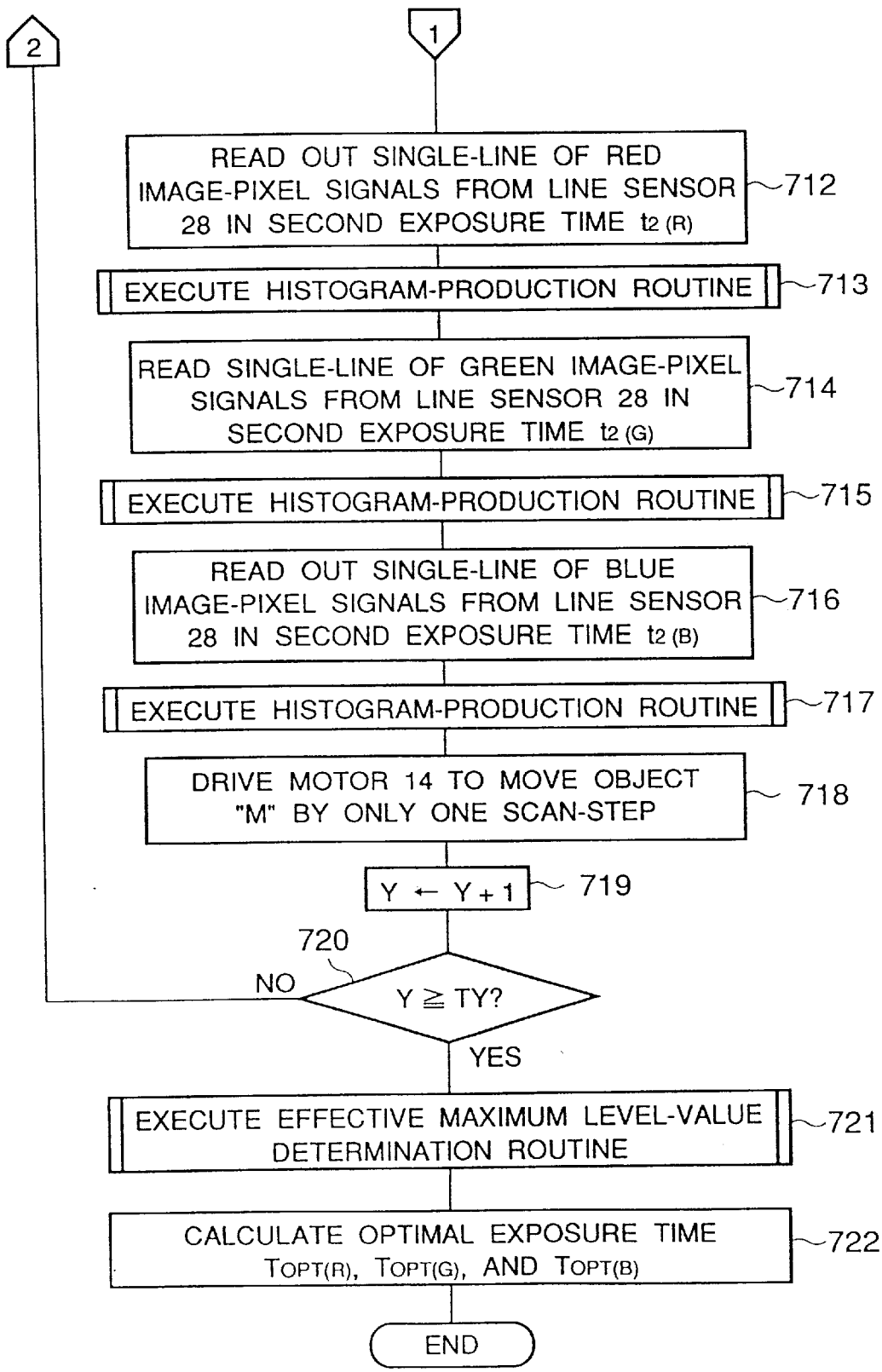
FIG. 17 is the remaining part of the flowchart showing the modification of the optimal exposure time determination routine shown in FIGS. 7 and 8.

FIGS. 16 and 17 show a flowchart for a modification of the optimal exposure determination routine shown in FIGS. 7 and 8. The modified routine is substantially identical to the routine of FIGS. 7 and 8 except that step 711-1 and step 711-2 are inserted between step 711 and step 712.

In particular, in the modified routine, after the respective first red-histogram $H_{1(R)}$, first green-histogram $H_{1(G)}$ and first blue-histogram $H_{1(B)}$ are partially produced on the basis of the single-line of digital red image-pixel signals ($R1_Y$), single-line of digital green image-pixel signals ($G1_Y$), and single-line of digital blue image-pixel signals ($B1_Y$), the drive motor 14 is driven to advance the carriage 10 (i.e. the transparent object M) by one scan-step (step 711-1). Then, the counter Y is incremented by one (step 711-2).

Consequently, at steps 712 to 717, the respective second red-histogram $H_{2(R)}$, second green-histogram $H_{2(G)}$ and second blue-histogram $H_{2(B)}$ are partially produced on the basis of the single-line of digital red image-pixel signals ($R2_Y$), single-line of digital green image-pixel signals ($G2_Y$), and single-line of digital blue image-pixel signals ($B2_Y$). After the partial production of the respective second red-histogram $H_{2(R)}$, second green-histogram $H_{2(G)}$ and second blue-histogram $H_{2(B)}$, the drive motor 14 is driven to advance the carriage 10 (i.e. the transparent object M) by one scan-step (step 718). Then, the counter Y is incremented by one (step 719). Then, it is determined whether a count number of the counter Y has reached TY (step 720). If Y<TY, the control returns from step 720 to step 706.

Namely, in the modified routine of FIGS. 16 and 17, for example, the frame of digital red image-pixel signals, on which the production of the first red-histogram $H_{1(R)}$ is based, is different from the frame of digital red image-pixel signals, on which the production of the second red-histogram $H_{2(R)}$ is based. Of course, the same is true for a relationship between the respective first green-histogram $H_{1(G)}$ and first blue-histogram $H_{1(B)}$ and the respective second green-histogram $H_{2(G)}$ and second blue-histogram $H_{2(G)}$.

Accordingly, an accuracy of the determination of the optimal exposure period, according to the modified routine of FIGS. 16 and 17, may be somewhat inferior to that of the determination of the optimal exposure period, according to the routine of FIGS. 7 and 8. Nevertheless, the advantage of the modified routine of FIGS. 16 and 17 over the routine of FIGS. 7 and 8 is that the execution time of the pre-reading operation can be decreased, provided that the same scan-pitch is set in both pre-reading operations.

Figure 18:
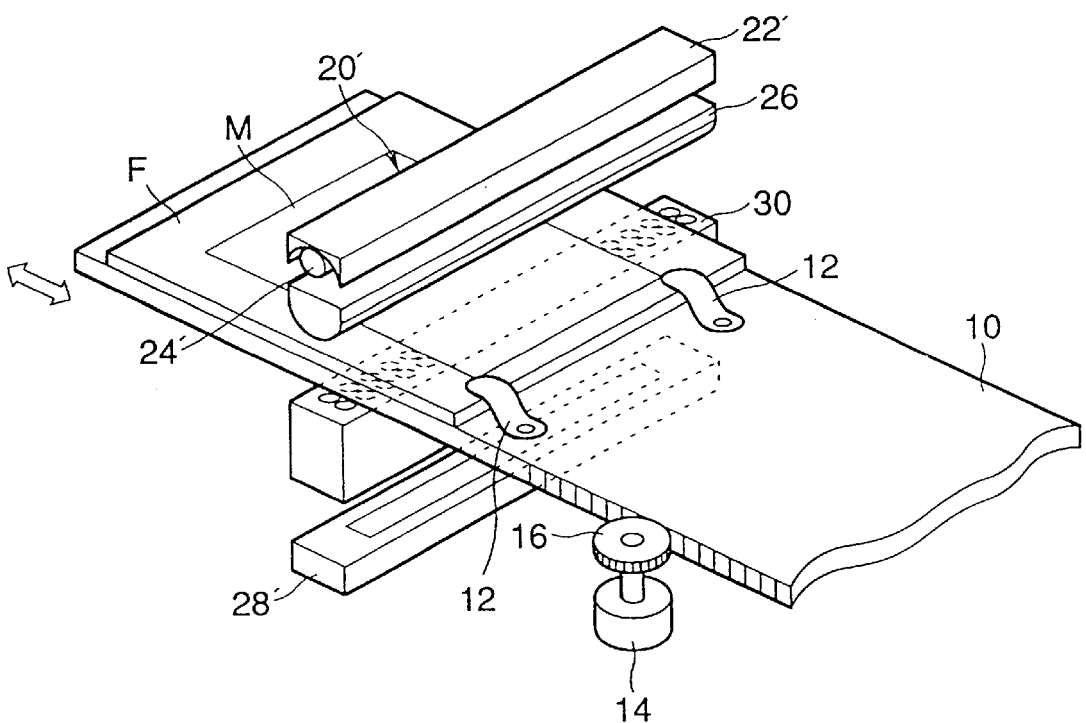
FIG. 18 is a schematic perspective view of a second embodiment of an image reader according to the present invention.

FIG. 18 shows a second embodiment of the image reader according to the present invention. The second embodiment is identical to the first embodiment of FIGS. 1 and 2 except that a white-light source 20' and a CCD line color-image sensor 28' are substituted for the light source 20 and the CCD line image sensor 28, respectively.

The white light source 20' includes an elongated frame member 22', and a fluorescent lamp 24' supported thereby. The elongated frame member 22' has a cylindrical concave reflective surface longitudinally extended and formed at a lower side thereof, and the fluorescent lamp 24' is disposed in and longitudinally extended along the cylindrical concave reflective surface of the frame member 22', as is apparent from FIG. 18.

Figure 19:
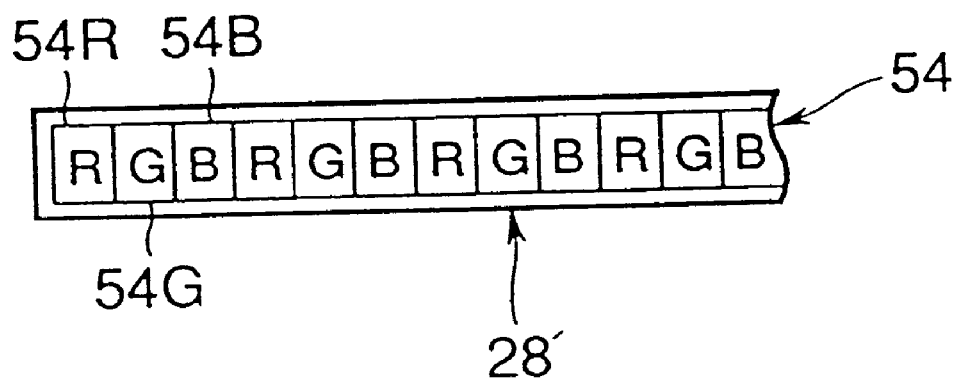
FIG. 19 is a partial plan view showing a CCD line color-image sensor used in the second embodiment of the image reader shown in FIG. 18.

Similar to the CCD line image sensor 28, the CCD line color-image sensor 28' includes a plurality of CCD elements aligned with each other, and a linear light-receiving surface of the CCD line color-image sensor 28' is formed by the alignment of the CCD elements. However, as shown in FIG. 19, the CCD line color-image sensor 28' is provided with a color filter 54 including a plurality of red-filter elements 54R, a plurality of green-filter elements 54G, and a plurality of blue-filter elements 54B, and these color-filter elements 54R, 54G and 54B are alternately and uniformly aligned with each other. In this second embodiment, the alignment of the color-filter elements 54R, 54G and 54B is performed in an order of: the red-filter element 54R, the green-filter element 54G and the blue-filter element 54B.

Also, a number of the color-filter elements 54R, 54G and 54B is equal to a number of the CCD elements of the CCD line color-image sensor 28', and each of the color-filter elements 54R, 54G and 54B is aligned with the corresponding CCD element. Thus, each of the CCD elements is exposed to monochromatic light rays (red, green, blue) in accordance with a corresponding color-filter element (54R, 54G, 54B).

Note, preferably, the number of the CCD elements of the CCD line color-image sensor 28' should be more than that of the CCD elements of the CCD line image sensor 28 in order to increase the number of red, green or blue image-pixel signals included in one single-line. Also, note, in the second embodiment, an arrangement of the light source 20' is simpler than that of the light source 20 of the first embodiment.

Figure 20:
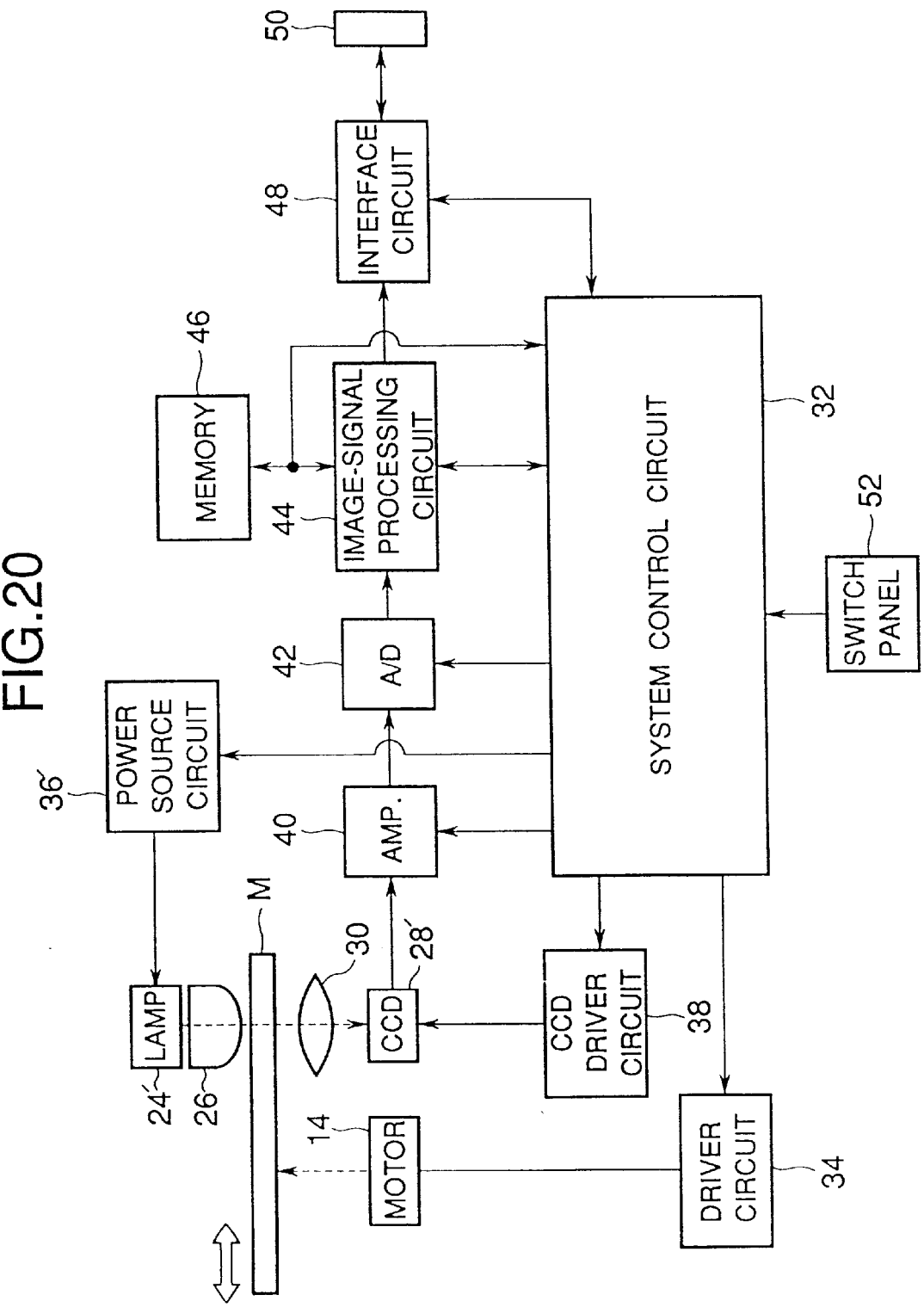
FIG. 20 is a schematic block diagram of the image reader shown in FIG. 18.

FIG. 20 schematically shows a block diagram of the image reader shown in FIG. 18. The block diagram of FIG. 20 is substantially identical to the block diagram of FIG. 2 except that the fluorescent lamp 24' is powered ON by a power source circuit 36', substituted for the LED driver circuit 36 of FIG. 2, and that the CCD line color-image sensor 28' is driven by the CCD driver circuit 38.

Figure 21:
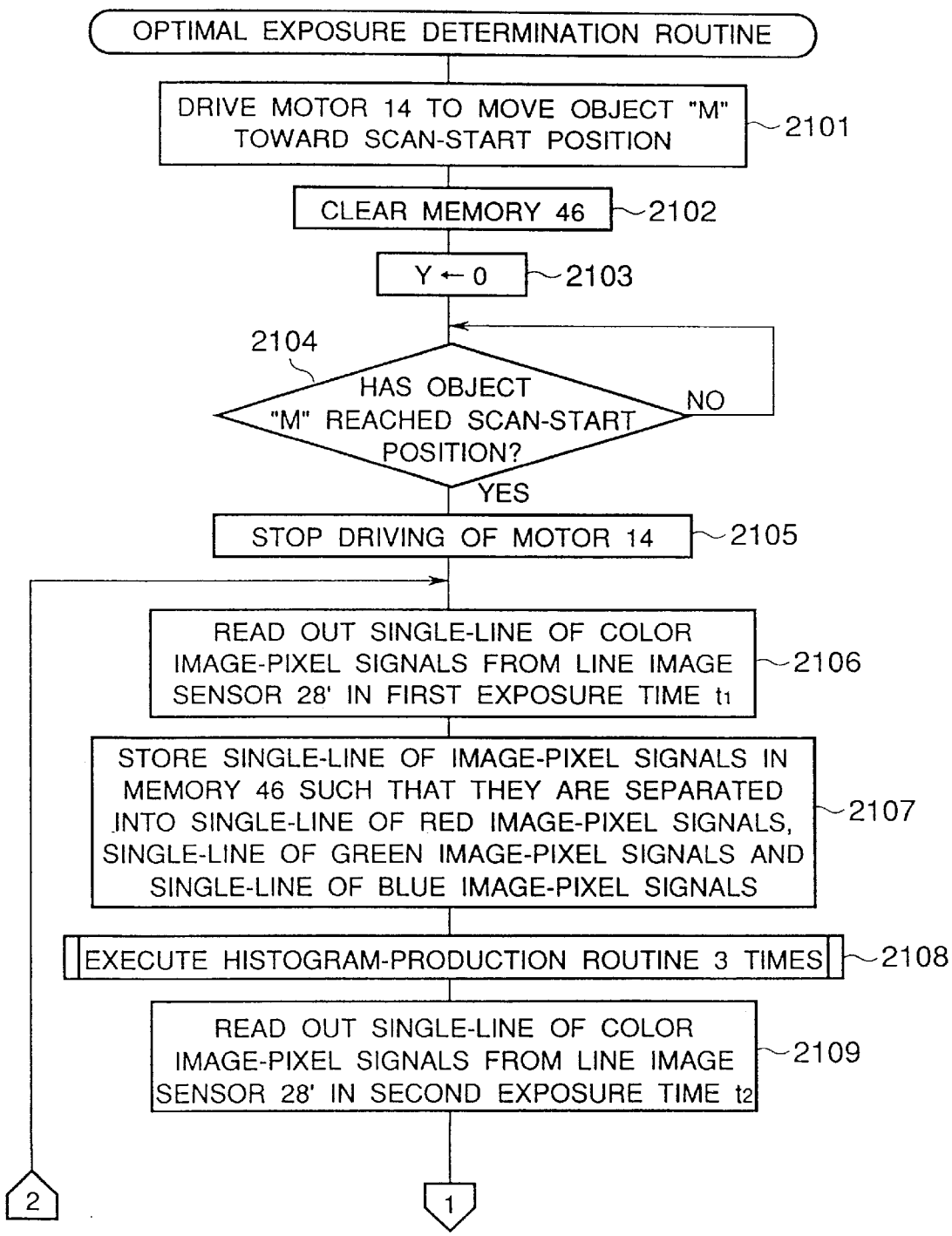
FIG. 21 is a part of a flowchart showing an optimal exposure time determination routine executed in the second embodiment of the image reader according to the present invention.
Figure 22:
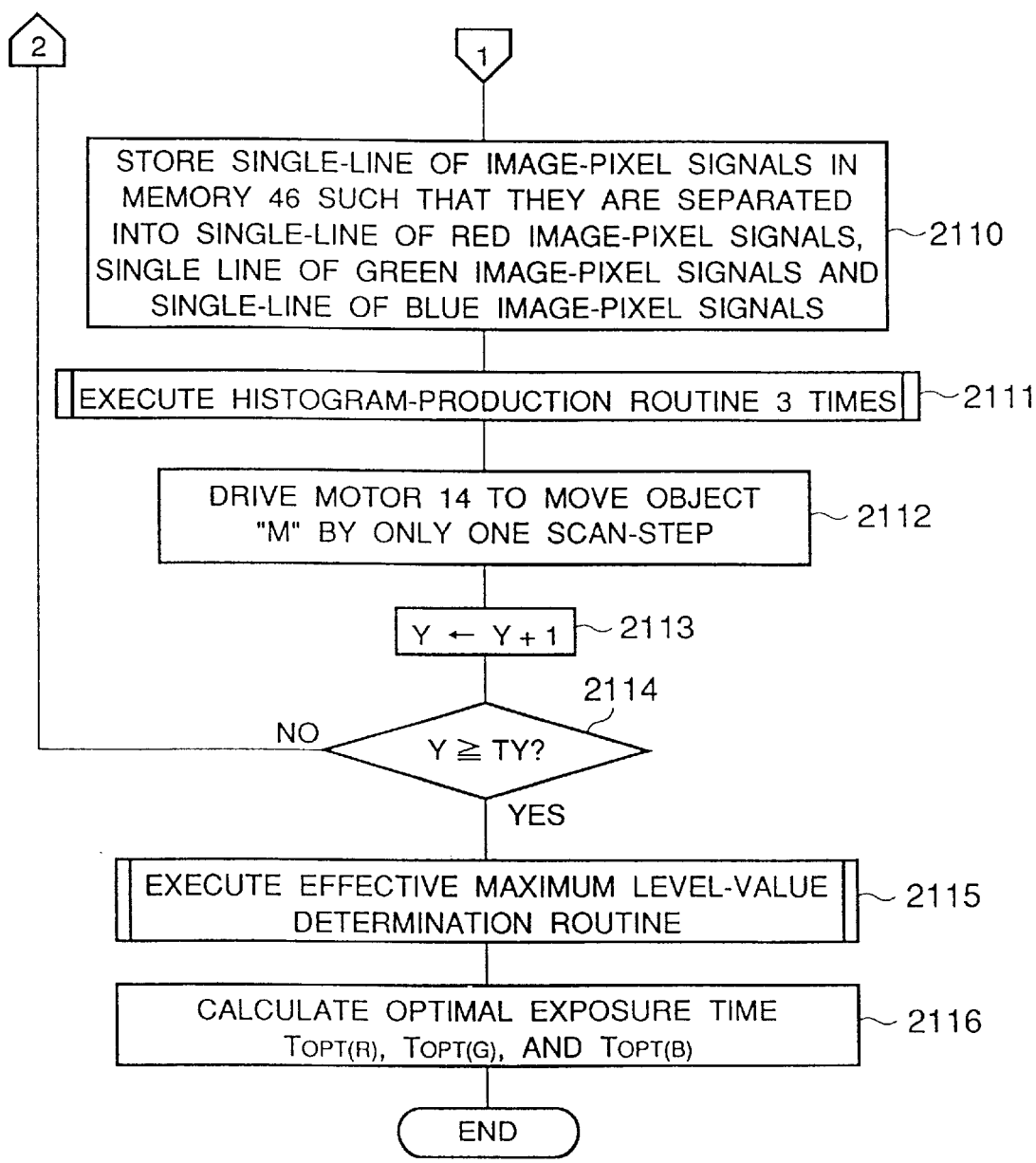
FIG. 22 is the remaining part of the flowchart showing the optimal exposure time determination routine executed in the second embodiment of the image reader according to the present invention.
Figure 23:
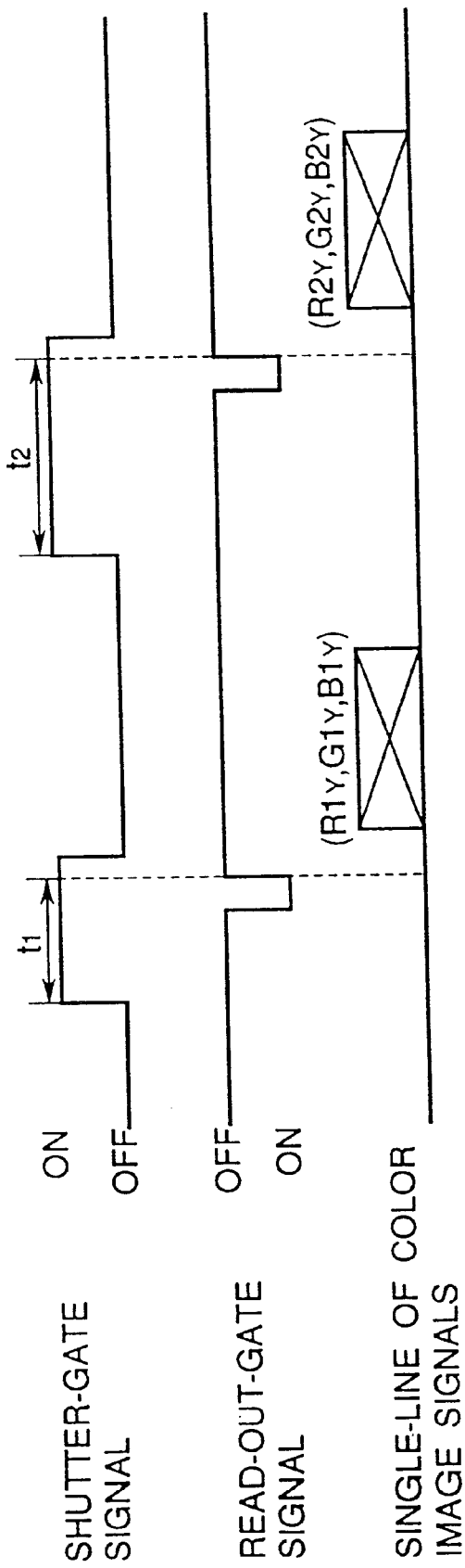
FIG. 23 is a timing chart for assisting in an explanation of the flowchart shown in FIGS. 21 and 22.

FIGS. 21 and 22 show a flowchart of a determination routine for determining an optimal exposure period, executed in the second embodiment of the image reader according to the present invention. Similar to the first embodiment, the execution is started by turning ON the pre-reading-operation-start switch provided on the switch panel 52 after the power ON/OFF switch of the image reader is turned ON. FIG. 23 shows a timing chart for assisting in an explanation of the pre-reading operation routine of FIGS. 21 and 22.

Note, in this second embodiment, when the power ON/OFF switch is turned ON, the fluorescent lamp 24' is powered ON by the power source circuit 36'.

At step 2101, the drive motor 14 is driven to move the carriage 10, and the transparent object M, toward a scan-start position. At step 2102, the memory 46 is cleared, and, at step 2103, a counter Y is reset. Note, the counter Y counts a number of scan-steps or moving-steps of the transparent object M, during a pre-reading operation of a recorded image of the transparent object M.

At step 2104, it is monitored whether the transparent object M, held on the frame holder F, has reached a scan-start position. When it is confirmed that the transparent object M has reached the scan-start position, the control proceeds to step 2105, in which the driving of the drive motor 14 is stopped.

At step 2106, the CCD elements of the CCD line color-image sensor 28' are exposed to the white light rays passing through the color filter 54 over a first exposure period $t_1$ (FIG. 6), and then a single-line of color image-pixel signals ($R1_Y$, $G1_Y$, $B1_Y$) is read from the CCD line color-image sensor 28', as shown in the timing chart of FIG. 23. The single-line of color image-pixel signals ($R1_Y$, $G1_Y$, $B1_Y$) is successively converted into digital color image-pixel signals by the A/D converter 42.

In particular, a shutter-gate signal is turned ON at a given timing, as shown in the timing chart of FIG. 23, whereby an electronic shutter of the CCD line color-image sensor 28' is opened, enabling the exposure of the CCD elements of the CCD line color-image sensor 28' to the white light rays to be started. Namely, as soon as the shutter-gate signal is turned ON, an electric charge is started to be generated and accumulated in each of the CCD elements of the CCD line color-image sensor 28'.

Then, when a read-out-gate signal is turned ON, as shown in the timing chart of FIG. 23, the single-line of color image-pixel signals ($R1_Y$, $G1_Y$, $B1_Y$) is shifted from the CCD elements of the CCD line color-image sensor 28' to a transfer CCD path thereof. As is apparent from the timing chart of FIG. 23, when the read-out-gate signal is turned OFF, i.e. when the shifting of the single-line of color image-pixel signals ($R1_Y$, $G1_Y$, $B1_Y$) from the CCD elements to the transfer CCD path thereof is completed, the first exposure period $t_1$ ends. Just after the read-out-gate signal is turned OFF, the shutter-gate signal is also turned OFF, and thus residual electric charges are drained out from all of the CCD elements of the CCD line color-image sensor 28'.

On the other hand, the shifted color image-pixel signals ($R1_Y$, $G1_Y$, $B1_Y$) are read out from the CCD line color-image sensor 28', and are amplified by the amplifier 40. Then, the amplified color image-pixel signals ($R1_Y$, $G1_Y$, $B1_Y$) are successively converted into digital color image-pixel signals by the A/D converter 42.

At step 2107, the single-line of digital color image-pixel signals ($R1_Y$, $G1_Y$, $B1_Y$) is stored in the memory 46 in such a manner that they are separated into a single-line of digital red image-pixel signals ($R1_Y$), a single-line of digital green image-pixel signals ($G1_Y$) and a single-line of digital blue image-pixel signals ($B1_Y$).

At step 2108, the histogram-production routine, as shown in FIG. 11, is executed three times, such that a first red-histogram, a first green-histogram and a first blue-histogram, each of which corresponds to the first histogram $H_1$ of FIG. 5, are partially produced on the basis of the single-line of digital red image-pixel signals ($R1_Y$), the single-line of digital green image-pixel signals ($G1_Y$) and the single-line of digital blue image-pixel signals ($B1_Y$), respectively.

At step 2109, the CCD elements of the CCD line color-image sensor 28' are exposed to the white light rays over a second exposure period $t_2$ (FIG. 6), and then a single-line of color image-pixel signals ($R2_Y$, $G2_Y$, $B2_Y$) is read from the CCD line color-image sensor 28', as shown in the timing chart of FIG. 23. The single-line of color image-pixel signals ($R2_Y$, $G2_Y$, $B2_Y$) is successively converted into a single-line of digital color image-pixel signals by the A/D converter 42.

In particular, the shutter-gate signal is turned ON at a given timing, as shown in the timing chart of FIG. 23, whereby the electronic shutter of the CCD line color-image sensor 28' is opened, enabling the exposure of the CCD elements of the CCD line color-image sensor 28' to the white light rays to be started. Namely, as soon as the shutter-gate signal is turned ON, an electric charge is started to be generated and accumulated in each of the CCD elements of the CCD line color-image sensor 28'.

Then, when the read-out-gate signal is turned ON, as shown in the timing chart of FIG. 23, the single-line of color image-pixel signals ($R2_Y$, $G2_Y$, $B2_Y$) is shifted from the CCD elements of the CCD line color-image sensor 28' to the transfer CCD path thereof. As is apparent from the timing chart of FIG. 23, when the read-out-gate signal is turned OFF, i.e. when the shifting of the single-line of color image-pixel signals ($R2_Y$, $G2_Y$, $B2_Y$) from the CCD elements to the transfer CCD path thereof is completed, the first exposure period $t_2$ ends. Just after the read-out-gate signal is turned OFF, the shutter-gate signal is also turned OFF, and thus residual electric charges are drained out from all of the CCD elements of the CCD line color-image sensor 28'.

On the other hand, the shifted color image-pixel signals ($R2_Y$, $G2_Y$, $B2_Y$) are read out from the CCD line color-image sensor 28', and are amplified by the amplifier 40. Then, the amplified color image-pixel signals ($R2_Y$, $G2_Y$, $B2_Y$) are successively converted into digital color image-pixel signals by the A/D converter 42.

At step 2110, the single-line of digital color image-pixel signals ($R2_Y$, $G2_Y$, $B2_Y$) is stored in the memory 46 in such a manner that they are separated into a single-line of digital red image-pixel signals ($R2_Y$), a single-line of digital green image-pixel signals ($G2_Y$) and a single-line of digital blue image-pixel signals ($B2_Y$).

At step 2111, the histogram-production routine, as shown in FIG. 11, is executed three times, so that a second red-histogram, a second green-histogram and a second blue-histogram, each of which corresponds to the second histogram $H_2$ of FIG. 5, are partially produced on the basis of the single-line of digital red image-pixel signals ($R2_Y$) the single-line of digital green image-pixel signals ($G2_Y$) and the single-line of digital blue image-pixel signals ($B2_Y$), respectively.

At step 2112, the drive motor 14 is driven to advance the carriage 10, and therefore, the transparent object M, by one scan-step. Then, at step 2113, the counter Y is incremented by one, and the control proceeds to step 2114, in which it is determined whether a count number of the counter Y has reached TY. As already mentioned above, TY represents a total number of scan-steps which is necessary for completely reading the recorded image of the transparent object M in the pre-reading operation, and the total scan-steps TY may be previously set and stored in the ROM of the system control circuit 32.

If Y<TY, the control returns from step 2114 to step 2106, and the routine comprising steps 2106 to 2114 is repeatedly executed until the count number of the counter Y reaches TY. At step 2114, when the count number of the counter Y has reached TY, i.e. when the pre-reading operation is completed, the control proceeds from step 2114 to 2115.

Note, at this stage, the production of the first and second red-histograms based on all of the single-lines of digital red image-pixel signals $R1_Y$ and $R2_Y$, the production of the first and second green-histograms based on all of the single-lines of digital green image-pixel signals $G1_Y$ and $G2_Y$, and the production of the first and second blue-histograms based on all of the single-lines of digital blue image-pixel signals $B1_Y$ and $B2_Y$ have been completed.

At step 2115, the effective maximum level-value determination routine, as shown in FIGS. 13 to 15, is executed in substantially the same manner as in step 721 of the routine of FIGS. 7 and 8, whereby respective effective maximum level-values $L_{1(R)}$, $L_{1(G)}$ and $L_{1(B)}$, each of which corresponds to $L_1$ of FIG. 5, are obtained from the first red-histogram, first green-histogram and first blue-histogram, and respective effective maximum level-values $L_{2(R)}$, $L_{2(G)}$ and $L_{2(B)}$, each of which corresponds to $L_2$ of FIG. 5, are obtained from the second red-histogram, second green-histogram and second blue-histogram.

Then, at step 2116, optimal exposure periods $T_{OPT(R)}$, $T_{OPT(G)}$ and $T_{OPT(B)}$ are calculated in the same manner as in step 722 of the routine of FIGS. 7 and 8.

The calculated results, i.e. the optimal exposure periods $T_{OPT(R)}$, $T_{OPT(G)}$ and $T_{OPT(B)}$, are stored in the RAM of the system control circuit 32, and are used when a regular reading operation is executed in the image reader.

Figure 24:
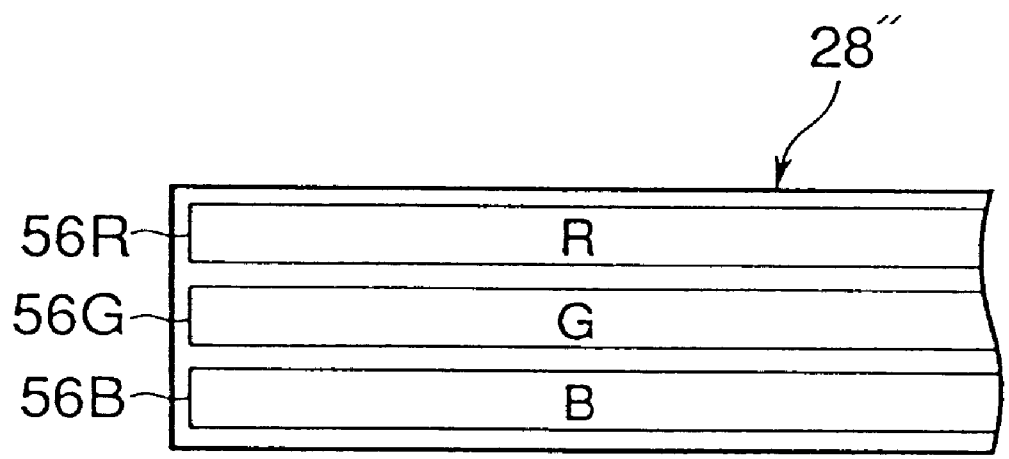
FIG. 24 is a partial plan view showing a three-line-type CCD color-image sensor used in a third embodiment of the image reader according to the present invention.

FIG. 24 shows a three-line-type CCD color-image sensor 28", used in a third embodiment of the image reader according to the present invention. Namely, in the third embodiment, the three-line-type CCD color-image sensor 28" is substituted for the CCD line color-image sensor 28' in the arrangement of the image reader as shown in FIG. 18.

The three-line-type CCD color-image sensor 28" is provided with three rows of CCD elements, each row having a plurality of CCD elements aligned with each other, and the three rows of CCD elements are covered by a red filter strip element 56R, a green filter strip element 56G and a blue filter strip element 56B, respectively. Accordingly, when the fluorescent lamp 24' is powered ON, the CCD elements, covered by the red filter strip element 56R, are illuminated with the red-light rays, the CCD elements, covered by the green filter strip element 56G, are illuminated with the green-light rays, and the CCD elements, covered by the blue filter strip element 56B, are illuminated with the blue-light rays.

Figure 25:
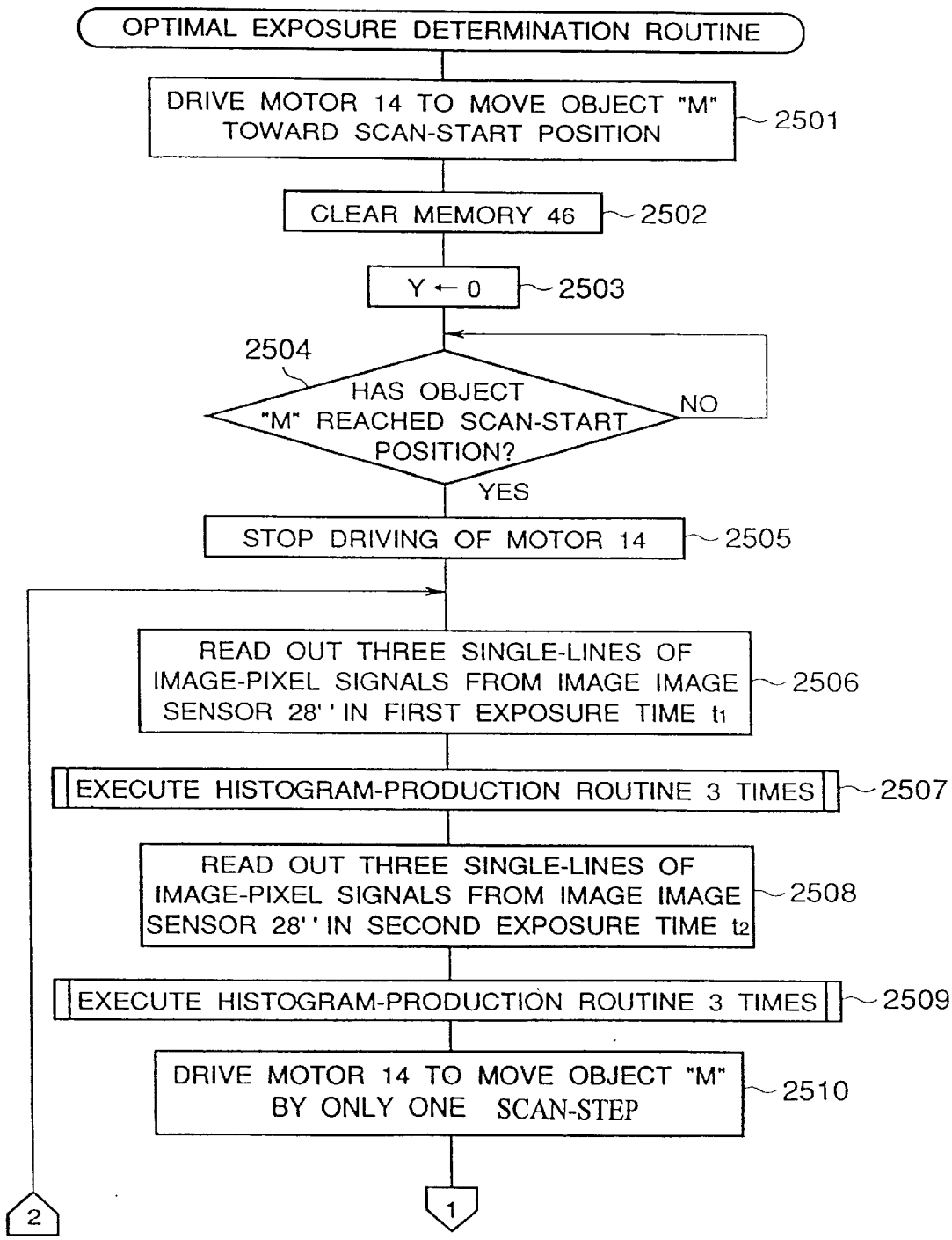
FIG. 25 is a part of a flowchart showing an optimal exposure time determination routine executed in the third embodiment of the image reader according to the present invention.
Figure 26:
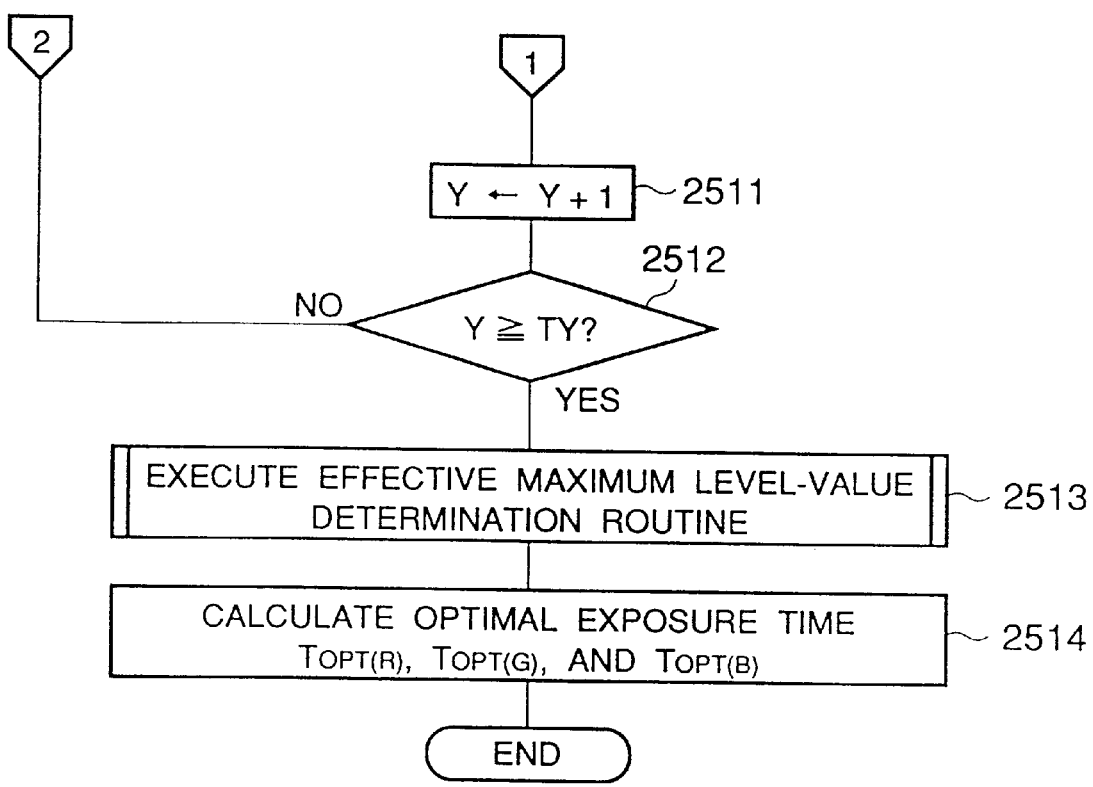
FIG. 26 is the remaining part of the flowchart showing the optimal exposure time determination routine executed in the third embodiment of the image reader according to the present invention.
Figure 27:
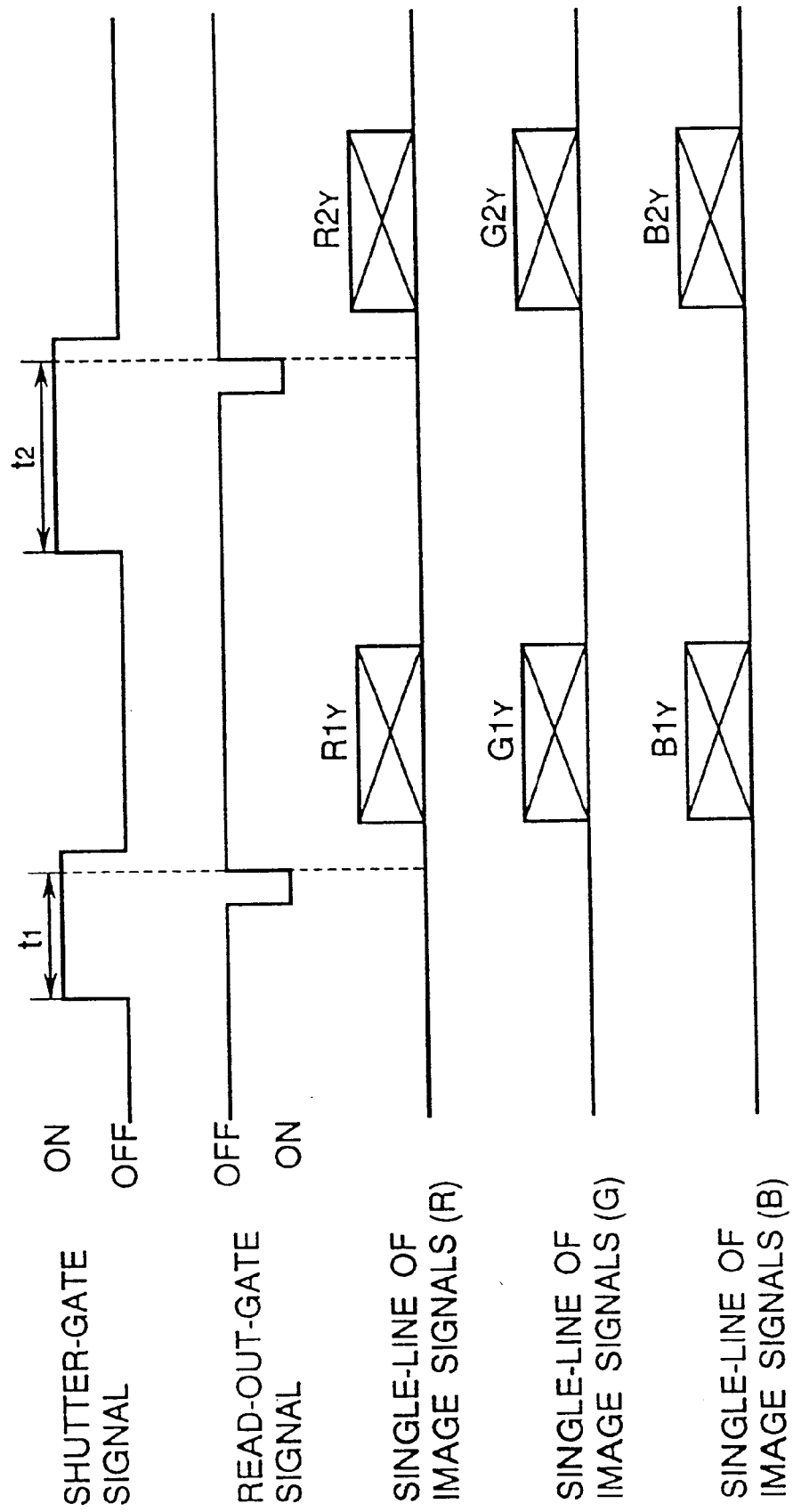
FIG. 27 is a timing chart for assisting in an explanation of the flowchart shown in FIGS. 25 and 26.

FIGS. 25 and 26 show a flowchart of a determination routine for determining an optimal exposure period, executed in the third embodiment of the image reader according to the present invention. Similar to the first embodiment, the execution is started by turning ON the pre-reading-operation-start switch provided on the switch panel 52 after the power ON/OFF switch of the image reader is turned ON. FIG. 27 shows a timing chart for assisting in an explanation of the pre-reading operation routine of FIGS. 25 and 26.

Note, in this third embodiment, when the power ON/OFF switch is turned ON, the fluorescent lamp 24' is powered ON by the power source circuit 361.

At step 2501, the drive motor 14 is driven to move the carriage 10, and the transparent object M, toward a scan-start position. At step 2502, the memory 46 is cleared, and, at step 2503, a counter Y is reset. Note, the counter Y counts a number of scan-steps or moving-steps of the transparent object M, during a pre-reading operation of a recorded image of the transparent object M.

At step 2504, it is monitored whether the transparent object M, held on the frame holder F, has reached a scan-start position. When it is confirmed that the transparent object M has reached the scan-start position, the control proceeds to step 2505, in which the driving of the drive motor 14 is stopped.

At step 2506, the CCD elements of the three-line-type CCD color-image sensor 28" are exposed to the white light rays over a first exposure period $t_1$ (FIG. 6), and then a single-line of red image-pixel signals ($R1_Y$), a single-line of green image-pixel signals ($G1_Y$) and a single-line of blue image-pixel signals ($B1_Y$) are simultaneously read from the CCD color-image sensor 28", as shown in the timing chart of FIG. 27. The read color image-pixel signals ($R1_Y$, $G1_Y$, $B1_Y$) are successively converted into digital color image-pixel signals by the A/D converter 42, and the converted digital color image-pixel signals are stored in the memory 46.

In particular, a shutter-gate signal is turned ON at a given timing, as shown in the timing chart of FIG. 27, whereby an electronic shutter of the CCD color-image sensor 28" is opened so that the exposure of the CCD elements of the CCD color-image sensor 28" to the white light rays is started. Namely, as soon as the shutter-gate signal is turned ON, an electric charge is started to be generated and accumulated in each of the CCD elements of the CCD color-image sensor 28".

Then, when a read-out-gate signal is turned ON, as shown in the timing chart of FIG. 27, the respective three single-lines of color image-pixel signals ($R1_Y$, $G1_Y$, $B1_Y$) are shifted from the CCD elements of the CCD color-image sensor 28" to three transfer CCD paths thereof. As is apparent from the timing chart of FIG. 27, when the read-out-gate signal is turned OFF, i.e. when the shifting of the single-lines of color image-pixel signals ($R1_Y$, $G1_Y$, $B1_Y$) from the CCD elements to the transfer CCD paths thereof is completed, the first exposure period $t_1$ ends. Just after the read-out-gate signal is turned OFF, the shutter-gate signal is also turned OFF, and thus residual electric charges are drained out from all of the CCD elements of the CCD color-image sensor 28".

On the other hand, the shifted color image-pixel signals ($R1_Y$, $G1_Y$, $B1_Y$) are read out from the CCD color-image sensor 28", and are amplified by the amplifier 40. Then, the amplified color image-pixel signals ($R1_Y$, $G1_Y$, $B1_Y$) are successively converted into digital color image-pixel signals by the A/D converter 42, and the converted color image-pixel signals are stored in the memory 46.

At step 2507, the histogram-production routine, as shown in FIG. 11, is executed three times, such that a first red-histogram, a first green-histogram and a first blue-histogram, each of which corresponds to the first histogram $H_1$ of FIG. 5, are partially produced on the basis of the single-line of digital red image-pixel signals ($R1_Y$), the single-line of digital green image-pixel signals ($G1_Y$) and the single-line of digital blue image-pixel signals ($B1_Y$), respectively.

At step 2508, the CCD elements of the three-line-type CCD color-image sensor 28" are exposed to the white light rays over a second exposure period $t_2$ (FIG. 6), and then a single-line of red image-pixel signals ($R2_Y$), a single-line of green image-pixel signals ($G2_Y$) and a single-line of blue image-pixel signals ($B2_Y$) are simultaneously read from the CCD color-image sensor 28", as shown in the timing chart of FIG. 27. The read color image-pixel signals ($R2_Y$, $G2_Y$, $B2_Y$) are successively converted into digital color image-pixel signals by the A/D converter 42, and the converted digital color image-pixel signals are stored in the memory 46.

In particular, the shutter-gate signal is turned ON at a given timing, as shown in the timing chart of FIG. 27, whereby the electronic shutter of the CCD color-image sensor 28" is opened, enabling the exposure of the CCD elements of the CCD color-image sensor 28" to the white light rays to be started. Namely, as soon as the shutter-gate signal is turned ON, an electric charge is started to be generated and accumulated in each of the CCD elements of the CCD color-image sensor 28".

Then, when the read-out-gate signal is turned ON, as shown in the timing chart of FIG. 27, the respective three single-lines of color image-pixel signals ($R2_Y$, $G2_Y$, $B2_Y$) are shifted from the CCD elements of the CCD color-image sensor 28" to three transfer CCD paths thereof. As is apparent from the timing chart of FIG. 27, when the read-out-gate signal is turned OFF, i.e. when the shifting of the single-lines of color image-pixel signals ($R2_Y$, $G2_Y$, $B2_Y$) from the CCD elements to the transfer CCD paths thereof is completed, the second exposure period $t_2$ ends. Just after the read-out-gate signal is turned OFF, the shutter-gate signal is also turned OFF, and thus residual electric charges are drained out from all of the CCD elements of the CCD color-image sensor 28".

On the other hand, the shifted color image-pixel signals ($R2_Y$, $G2_Y$, $B2_Y$) are read out from the CCD color-image sensor 28", and are amplified by the amplifier 40. Then, the amplified color image-pixel signals ($R2_Y$, $G2_Y$, $B2_Y$) are successively converted into digital color image-pixel signals by the A/D converter 42, and the converted color image-pixel signals are stored in the memory 46.

At step 2509, the histogram-production routine, as shown in FIG. 11, is executed three times, so that a second red-histogram, a second green-histogram and a second blue-histogram, each of which corresponds to the second histogram $H_2$ of FIG. 5, are partially produced on the basis of the single-line of digital red image-pixel signals ($R2_Y$) the single-line of digital green image-pixel signals ($G2_Y$) and the single-line of digital blue image-pixel signals ($B2_Y$), respectively.

At step 2510, the drive motor 14 is driven to advance the carriage 10, and therefore, the transparent object M, by one scan-step. Then, at step 2511, the counter Y is incremented by one, and the control proceeds to step 2512, in which it is determined whether a count number of the counter Y has reached TY. As already mentioned above, TY represents a total number of scan-steps which is necessary for completely reading the recorded image of the transparent object M in the pre-reading operation, and the total scan-steps TY may be previously set and stored in the ROM of the system control circuit 32.

If Y<TY, the control returns from step 2512 to step 2506, the routine comprising steps 2506 to 2512 is repeatedly executed until the count number of the counter Y reaches TY. At step 2512, when the count number of the counter Y has reached TY, i.e. when the pre-reading operation is completed, the control proceeds from step 2512 to 2513.

Note, at this stage, the production of the first and second red-histograms based on all of the single-lines of digital red image-pixel signals $R1_Y$ and $R2_Y$, the production of the first and second green-histograms based on all of the single-lines of digital green image-pixel signals $G1_Y$ and $G2_Y$, and the production of the first and second blue-histograms based on all of the single-lines of digital blue image-pixel signals $B1_Y$ and $B2_Y$ has been finished.

At step 2513, the effective maximum level-value determination routine, as shown in FIGS. 13 to 15, is executed in substantially the same manner as in step 721 of the routine of FIGS. 7 and 8, whereby respective effective maximum level-values $L_{1(R)}$, $L_{1(G)}$ and $L_{1(B)}$, each of which corresponds to $L_1$ of FIG. 5, are obtained from the first red-histogram, first green-histogram and first blue-histogram, and respective effective maximum level-values $L_{2(R)}$, $L_{2(G)}$ and $L_{2(B)}$ each of which corresponds to $L_2$ of FIG. 5, are obtained from the second red-histogram, second green-histogram and second blue-histogram.

Then, at step 2514, optimal exposure periods $T_{OPT(R)}$, $T_{OPT(G)}$ and $T_{OPT(B)}$ are calculated in the same manner as in step 722 of the routine of FIGS. 7 and 8.

The calculated results, i.e. the optimal exposure periods $T_{OPT(R)}$, $T_{OPT(G)}$ and $T_{OPT(B)}$, are stored in the RAM of the system control circuit 32, and are used when a regular reading operation is executed in the image reader.

Figure 28:
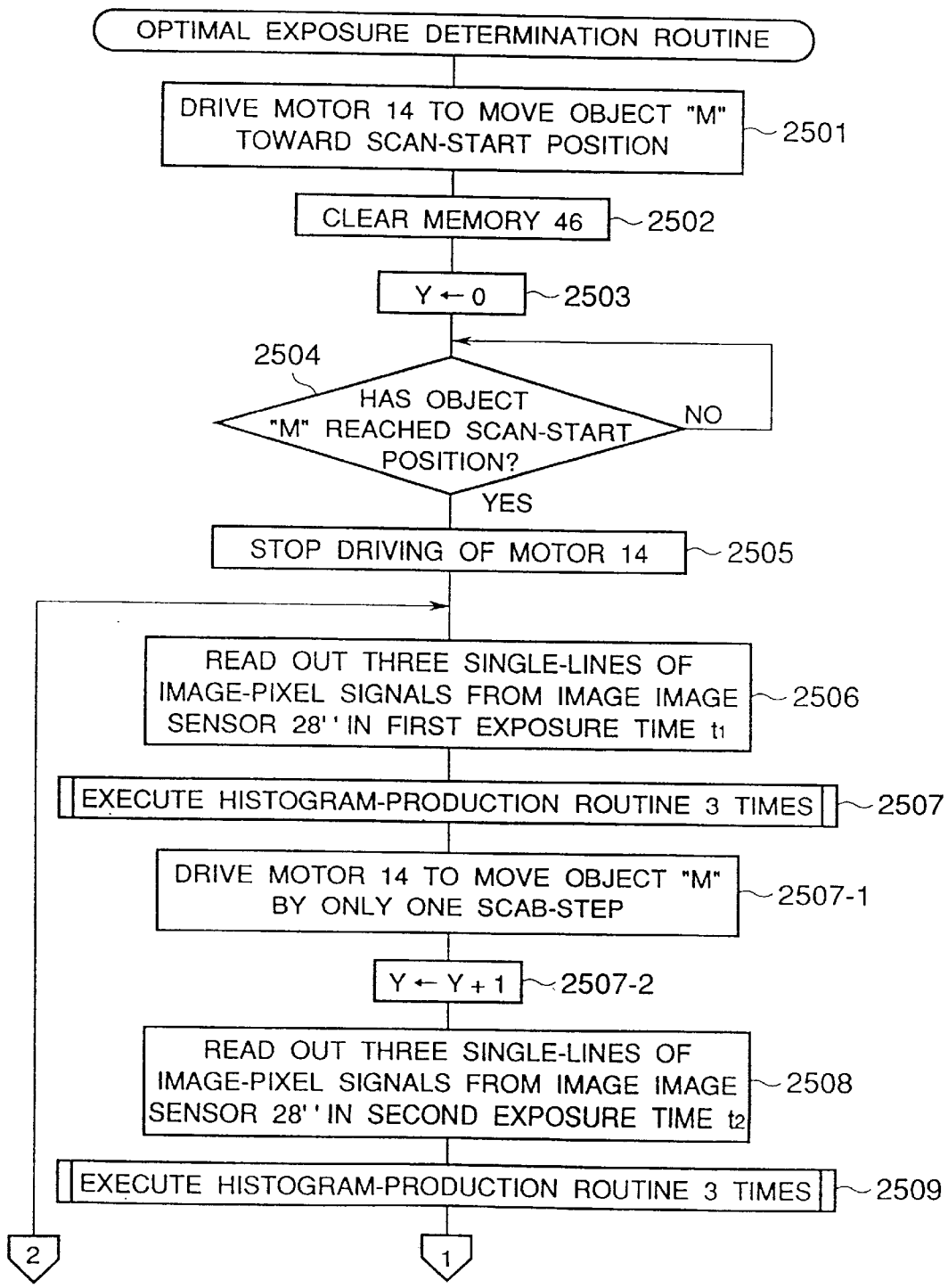
FIG. 28 is a part of a flowchart showing a modification of the optimal exposure time determination routine shown in FIGS. 25 and 26.
Figure 29:
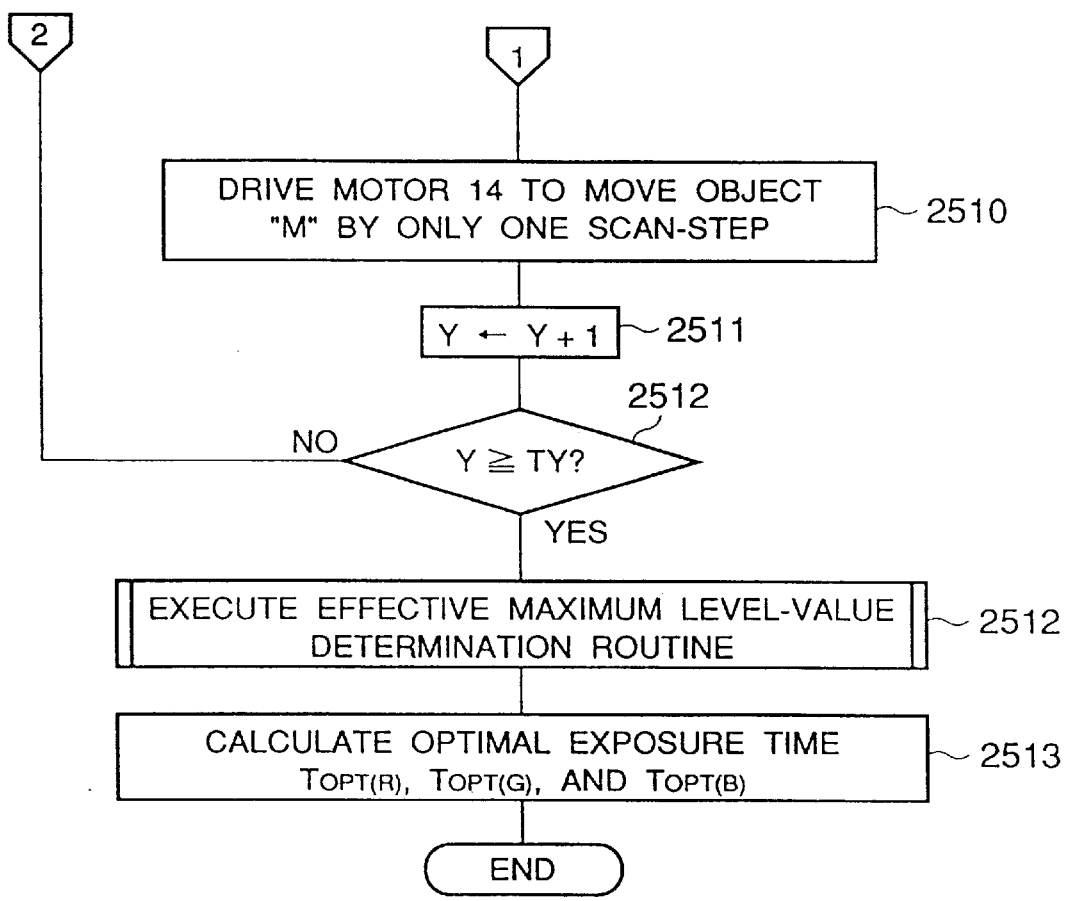
FIG. 29 is the remaining part of the flowchart showing the modification of the optimal exposure time determination routine shown in FIGS. 25 and 26.

FIGS. 28 and 29 show a flowchart for a modification of the optimal exposure determination routine shown in FIGS. 25 and 26. The modified routine is substantially identical to the routine of FIGS. 25 and 26 except that steps 2507-1 and step 2507-2 are inserted between step 2507 and step 2508.

In particular, in the modified routine, after the first red-histogram, first green-histogram and first blue-histogram are partially produced on the basis of the single-line of digital red image-pixel signals ($R1_Y$), single-line of digital green image-pixel signals ($G1_Y$), and single-line of digital blue image-pixel signals ($B1_Y$), respectively, the drive motor 14 is driven to advance the carriage 10 (i.e. the transparent object M) by one scan-step (step 2507-1). Then, the counter Y is incremented by one (step 2507-2).

Consequently, at steps 2508 and 2509, the second red-histogram, second green-histogram and second blue-histogram are partially produced on the basis of the single-line of digital red image-pixel signals ($R2_Y$) single-line of digital green image-pixel signals ($G2_Y$), and single-line of digital blue image-pixel signals ($B2_Y$), respectively. After the partial production of the second red-histogram, second green-histogram and second blue-histogram, respectively, the drive motor 14 is driven to advance the carriage 10 (i.e. the transparent object M) by one scan-step (step 2510). Then, the counter Y is incremented by one (step 2511), and it is determined whether a count number of the counter Y has reached TY (step 2512). If Y–TY, the control returns from step 2512 to step 2506.

Namely, in the modified routine of FIGS. 28 and 29, for example, the frame of digital red image-pixel signals, on which the production of the first red-histogram is based, is different from the frame of digital red image-pixel signals, on which the production of the second red-histogram is based. Of course, the same is true for a relationship between the respective first green-histogram and first blue-histogram and the respective second green-histogram and second blue-histogram.

Accordingly, an accuracy of the determination of the optimal exposure period, according to the modified routine of FIGS. 28 and 29, may be somewhat inferior to that of the determination of the optimal exposure period, according to the routine of FIGS. 25 and 26. Nevertheless, the advantage of the modified routine of FIGS. 28 and 29 over the routine of FIGS. 25 and 26 is that the execution time of the pre-reading operation can be decreased, provided that the same scan-pitch is set in both pre-reading operations.

Figure 30:
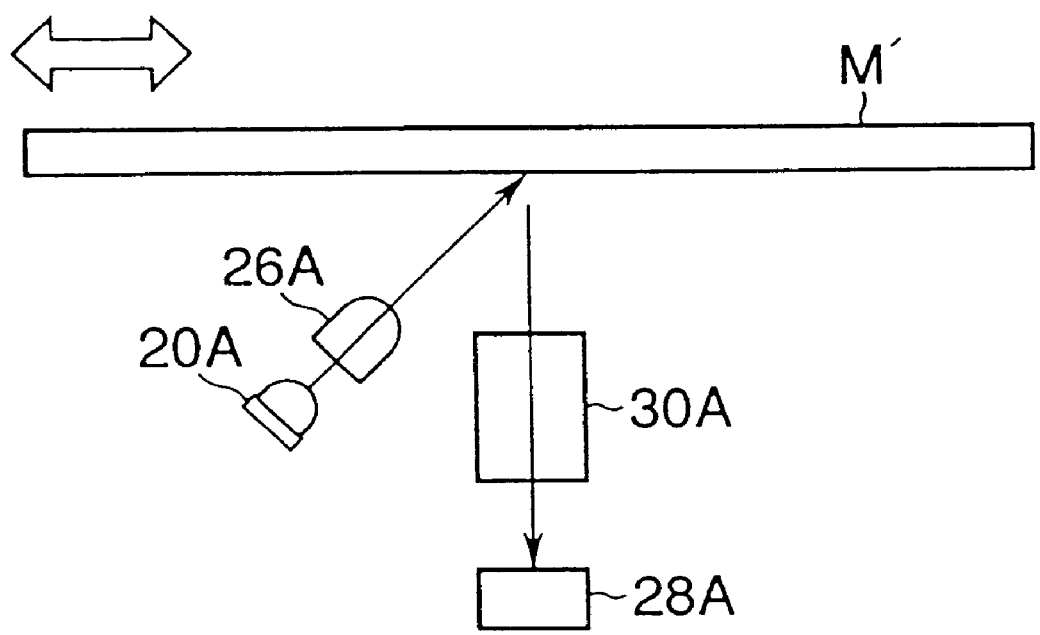
FIG. 30 is a partial schematic view showing another embodiment of the image reader according to the present invention.

FIG. 30 shows another embodiment of the image reader according to the present invention, which is arranged such that a recorded image is optically and electronically read from an opaque object M'. During a reading operation, the opaque object M' is intermittently moved along a predetermined path, as indicated by a double-headed open arrow. As shown in FIG. 30, a light source 20A, a cylindrical condenser lens 26A, focusing lens system 30A and a CCD line image sensor 28A are laced on the same side of the path of the opaque object M'.

Although the light source 20A is symbolically shown as a light emitting diode (LED), the light source 20A is arranged so as to cyclically and successively emit three-primary color light rays in the order of, for example, red-light rays, green-light rays and blue-light rays, as in the case of the first embodiment. Of course, the CCD line image sensor 28A is the same type as the CCD line image sensor 28 of the first embodiment.

In the reflection-type image reader as shown in FIG. 30, an optimal exposure period can be accurately determined in the same manner as mentioned in the previous embodiments.

Finally, it will be understood by those skilled in the art that the foregoing description is of the preferred embodiments of the device and that various changes and modifications may be made to the present invention without departing from the spirit and scope thereof.

The present disclosure relates to subject matter contained in Japanese Patent Application No. 9-175186 (filed on Jun. 16, 1997), which is expressly incorporated herein, by reference, in its entirety.

What is claimed is:

1. An image reader comprising:

a light source that illuminates a recorded image of a recording medium with light rays emitted therefrom;

an image sensor that optically and electronically senses said recorded image, as a series of image-pixel signals, by exposing said image sensor to said light rays, with which said recorded image is illuminated;

a first determiner that determines a first effective maximum level-value from a first series of image-pixel signals, which is obtained by exposing said image sensor to said light rays over a first exposure period; and a second determiner that determines a second effective maximum level-value from a second series of image-pixel signals, which is obtained by exposing said image sensor to said light rays over a second exposure period longer than said first exposure period, wherein an optimal exposure period on said recorded image is determined from a proportional calculation based on said first effective maximum level-value corresponding to said first exposure period, said second effective maximum level-value corresponding to said second exposure period, and a third predetermined effective maximum level-value corresponding to said optimal exposure period.

2. An image reader as set forth in claim 1, wherein said image sensor exhibits a characteristic curve, having at least a partial linear section, describing a relationship between a level-value of an image-pixel signal and an exposure period, over which said image sensor is exposed to said light rays, and said first exposure period and said second exposure period are encompassed within the partial linear section of said characteristic curve.

3. An image reader as set forth in claim 1, wherein said proportional calculation is based on the following formula:

$$T_{OPT} = [(L_{MAX} - L_1)/(L_2 - L_1)]*(t_2 - t_1) + t_1$$

Herein: $T_{OPT}$ indicates said optimal exposure period;

$L_{MAX}$ indicates said third predetermined effective maximum level-value corresponding to said optimal exposure period;

$t_1$ indicates said first exposure period;

$L_1$ indicates said first effective maximum level-value corresponding to said first exposure period;

$t_2$ indicates said second exposure period; and $L_2$ indicates said second effective maximum level-value corresponding to said second exposure period.

4. An image reader as set forth in claim 1, wherein said first determiner comprises a first histogram-producer that produces a first histogram on the basis of said first series of image-pixel signals and determines said first effective maximum level-value from said first histogram, and said second determiner comprises a second histogram-producer that produces a second histogram on the basis of said second series of image-pixel signals and determines said second effective maximum level-value from said second histogram.

5. An image reader as set forth in claim 4, wherein each of said first effective maximum level-value and said second effective maximum level-value is defined as a boundary-level-value of a predetermined area, which includes an actual-maximum level-value, of the corresponding histogram.

6. An image reader as set forth in claim 4, wherein said image sensor comprises a line image sensor, and said sensing of said recorded image from said recording medium is performed by scanning said recorded image with said line image sensor.

7. An image reader as set forth in claim 6, wherein said scanning of said recorded image with said line image sensor is carried out by intermittently and relatively moving said recorded image with respect to said line image sensor, and said exposure of said line image sensor to said light rays over said first exposure period and said exposure of said line image sensor to said light rays over said second exposure period are successively carried out during the intermittent stoppage of said recorded image with respect to said line image sensor.

8. An image reader as set forth in claim 7, wherein each of said first histogram-producer and said second histogram-producer partially produces the corresponding histogram whenever the exposure of the line image sensor to said light rays over the corresponding exposure period is carried out.

9. An image reader comprising:

a light source that illuminates a recorded image of a recording medium with at least two sorts of monochromatic light rays selectively emitted therefrom;

an image sensor that optically and electronically senses said recorded image, as a series of image-pixel signals, by exposing said image sensor to each of said two sorts of monochromatic light rays, with which said recorded image is illuminated;

a first determiner that determines a first effective maximum level-value from a first series of image-pixel signals, which is obtained by exposing said image sensor to each of said two sorts of monochromatic light rays over a first exposure period; and a second determiner that determines a second effective maximum level-value from a second series of image-pixel signals, which is obtained by exposing said image sensor to each of said two sorts of monochromatic light rays over a second exposure period longer than said first exposure period, wherein, with respect to each of said two sorts of monochromatic light rays, an optimal exposure period on said recorded image is determined from a proportional calculation based on said first effective maximum level-value corresponding to said first exposure period, said second effective maximum level-value corresponding to said second exposure period, and a third predetermined effective maximum level-value corresponding to said optimal exposure period.

10. An image reader as set forth in claim 9, wherein said image sensor exhibits a characteristic curve, having at least a partial linear section, describing a relationship between a level-value of an image-pixel signal and an exposure period, over which said image sensor is exposed to each of said two sorts of monochromatic light rays, and said first exposure period and said second exposure period are encompassed within the partial linear section of said characteristic curve.

11. An image reader as set forth in claim 9, wherein said proportional calculation is based on the following formula:

$$T_{OPT}=[(L_{MAX}-L_1)/(L_2 31\ L_1)]*(t_2-t_1)+t_1$$

Herein: $T_{OPT}$ indicates said optimal exposure period;
$L_{MAX}$ indicates said third predetermined effective maximum level-value corresponding to said optimal exposure period;
$t_1$ indicates said first exposure period;
$L_1$ indicates said first effective maximum level-value corresponding to said first exposure period;
$t_2$ indicates said second exposure period; and
$L_2$ indicates said second effective maximum level-value corresponding to said second exposure period.

12. An image reader as set forth in claim 9, wherein said first determiner comprises a first histogram-producer that produces a first histogram on the basis of said first series of image-pixel signals, which is derived from each of said two sorts of monochromatic light rays selectively emitted from said light source, and determines said first effective maximum level-value from said first histogram, and said second determiner comprises a second histogram-producer that produces a second histogram on the basis of said second series of image-pixel signals, which is derived from each of said two sorts of monochromatic light rays selectively emitted from said light source, and determines said second effective maximum level-value from said second histogram.

13. An image reader as set forth in claim 12, wherein each of said first effective maximum level-value and said second effective maximum level-value is defined as a boundary-level-value of a predetermined area, which includes an actual-maximum level-value, of the corresponding histogram.

14. An image reader as set forth in claim 12, wherein said image sensor comprises a line image sensor, and said sensing of said recorded image from said recording medium is performed by scanning said recorded image with said line image sensor.

15. An image reader as set forth in claim 14, wherein said scanning of said recorded image with said line image sensor is carried out by intermittently and relatively moving said recorded image with respect to said line image sensor, and said exposure of said line image sensor to said light rays over said first exposure period and said exposure of said line image sensor to said light rays over said second exposure period are successively carried out during the intermittent stoppage of said recorded image with respect to said line image sensor.

16. An image reader as set forth in claim 15, wherein each of said first histogram-producer and said second histogram-producer partially produces the corresponding histogram whenever the exposure of the line image sensor to said light rays over the corresponding exposure period is carried out.

17. An image reader comprising:
a light source that illuminates a recorded image of a recording medium with white-light rays;
a color-image sensor that optically and electronically senses said recorded image so as to output a series of at least two sorts of monochromatic image-pixel signals, by exposing said color-image sensor to said white-light rays, with which said recorded image is illuminated;
a first determiner that determines a first first-sort-monochromatic effective maximum level-value and a first second-sort-monochromatic effective maximum level-value from a first series of said at least two sorts of monochromatic image-pixel signals, which is obtained by exposing said color-image sensor to said white-light rays over a first exposure period; and
a second determiner that determines a second first-sort-monochromatic effective maximum level-value and a second second-sort-monochromatic effective maximum level-value from a second series of said at least two sorts of monochromatic image-pixel signals, which is obtained by exposing said color-image sensor to said white-light rays over a second exposure period longer than said first exposure period,
wherein, with respect to each of said two sorts of monochromatic image-pixel signals to be sensed by said color-image sensor during a regular reading operation, an optimal exposure period on said recorded image is determined from a proportional calculation based on the first corresponding-sort-monochromatic effective maximum level-value corresponding to said first exposure period, the second corresponding-sort-monochromatic effective maximum level-value corresponding to said second exposure period, and a third predetermined corresponding-sort-monochromatic effective maximum level-value corresponding to said optimal exposure period.

18. An image reader as set forth in claim 17, wherein said color-image sensor exhibits a characteristic curve, having at least a partial linear section, describing a relationship between a level-value of an image-pixel signal and an exposure period, over which said color-image sensor is exposed to said white-light rays, and said first exposure period and said second exposure period are encompassed within the partial linear section of said characteristic curve.

19. An image reader as set forth in claim 17, wherein said proportional calculation is based on the following formula:

$$T_{OPT}=[(L_{MAX}-L_1)/(L_2-L_1)]*(t_2-t_1)+t_1$$

Herein: $T_{OPT}$ indicates said optimal exposure period;
$L_{MAX}$ indicates said third predetermined corresponding-sort-monochromatic effective maximum level-value corresponding to said optimal exposure period;
$t_1$ indicates said first exposure period;
$L_1$ indicates said first corresponding-sort-monochromatic effective maximum level-value corresponding to said first exposure period;
$t_2$ indicates said second exposure period; and
$L_2$ indicates said second corresponding-sort-monochromatic effective maximum level-value corresponding to said second exposure period.

20. An image reader as set forth in claim 17, wherein said first determiner comprises a first histogram-producer that produces a first first-monochromatic-histogram and a first second-monochromatic-histogram on the basis of said first series of at least two sorts of monochromatic image-pixel signals and determines said first first-sort-monochromatic effective maximum level-value and said first second-sort-monochromatic effective maximum level-value from said first first-monochromatic-histogram and said first second-monochromatic-histogram, respectively, and said second determiner comprises a second histogram-producer that produces a second first-monochromatic-histogram and a second second-monochromatic-histogram on the basis of said second series of at least two sorts of monochromatic image-pixel signals and determines said second first-sort-monochromatic effective maximum level-value and said second second-sort-monochromatic effective maximum level-value from said second first-monochromatic-histogram and said second second-monochromatic-histogram, respectively.

21. An image reader as set forth in claim 20, wherein each of said first first-sort-monochromatic effective maximum level-value, said first second-sort-monochromatic effective maximum level-value, said second first-sort-monochromatic effective maximum level-value and said second second-sort monochromatic effective maximum level-value is defined as a boundary-level-value of a predetermined area, which includes an actual-maximum level-value, of the corresponding histogram.

22. An image reader as set forth in claim 20, wherein said color-image sensor comprises a line color-image sensor, and said sensing of said recorded image from said recording medium is performed by scanning said recorded image with said line color-image sensor.

23. An image reader as set forth in claim 22, wherein said scanning of said recorded image with said line color-image sensor is carried out by intermittently and relatively moving said recorded image with respect to said line color-image sensor, and said exposure of said line color-image sensor to said light rays over said first exposure period and said exposure of said line color-image sensor to said light rays over said second exposure period are successively carried out during the intermittent stoppage of said recorded image with respect to said line color-image sensor.

24. An image reader as set forth in claim 23, wherein each of said first histogram-producer and said second histogram-producer partially produces the corresponding two sorts of monochromatic histograms whenever the exposure of the line color-image sensor to said white-light rays over the corresponding exposure period is carried out.

25. An image reader comprising:
a light source that illuminates a recorded image of a recording medium with white-light rays;
a color-image sensor that optically and electronically senses said recorded image so as to output at least a series of first-sort-monochromatic image-pixel signals and a series of second-sort-monochromatic image-pixel signals by exposing said color-image sensor to said white-light rays, with which said recorded image is illuminated;
a first determiner that determines a first first-sort-monochromatic effective maximum level-value and a first second-sort-monochromatic effective maximum level-value from a first series of first-sort-monochromatic image-pixel signals and a first series of second-sort -monochromatic image-pixel signals, respectively, which are obtained by exposing said color-image sensor to said white-light rays over a first exposure period; and
a second determiner that determines a second first-sort-monochromatic effective maximum level-value and a second second-sort-monochromatic effective maximum level-value from a second series of first-sort-monochromatic image-pixel signals and a second series of second-sort-monochromatic image-pixel signals, respectively, which are obtained by exposing said color-image sensor to said white-light rays over a second exposure period longer than said first exposure period,
wherein, with respect to each of two sorts of monochromatic image-pixel signals to be sensed by said color-image sensor during a regular reading operation, an optimal exposure period on said recorded image is determined from a proportional calculation based on the first corresponding-sort-monochromatic effective maximum level-value corresponding to said first exposure period, the second corresponding-sort-monochromatic effective maximum level-value corresponding to said second exposure period, and a third predetermined corresponding-sort-monochromatic effective maximum level-value corresponding to said optimal exposure period.

26. An image reader as set forth in claim 25, wherein said color-image sensor exhibits a characteristic curve, having at least a partial linear section, describing a relationship between a level-value of an image-pixel signal and an exposure period, over which said color-image sensor is exposed to said white-light rays, and said first exposure period and said second exposure period are encompassed within the partial linear section of said characteristic curve.

27. An image reader as set forth in claim 25, wherein said proportional calculation is based on the following formula:

$$T_{OPT} = [(L_{MAX} - L_1)/(L_2 - L_1)] * (t_1 - t_1) + t_1$$

Herein: $T_{OPT}$ indicates said optimal exposure period;
$L_{MAX}$ indicates said third predetermined corresponding-sort-monochromatic effective maximum level-value corresponding to said optimal exposure period;
$t_1$ indicates said first exposure period;
$L_1$ indicates said first corresponding-sort-monochromatic effective maximum level-value corresponding to said first exposure period;
$t_2$ indicates said second exposure period; and
$L_2$ indicates said second corresponding-sort-monochromatic effective maximum level-value corresponding to said second exposure period.

28. An image reader as set forth in claim 25, wherein said first determiner comprises a first histogram-producer that produces a first first-monochromatic-histogram and a first second-monochromatic-histogram on the basis of said first series of at least two sorts of monochromatic image-pixel signals and determines said first first-sort-monochromatic effective maximum level-value and said first second-sort-monochromatic effective maximum level-value from said first first-monochromatic-histogram and said first second-monochromatic-histogram, respectively, and said second determiner comprises a second histogram-producer that produces a second first-monochromatic-histogram and a second second-monochromatic-histogram on the basis of said second series of at least two sorts of monochromatic image-pixel signals and determines said second first-sort-monochromatic effective maximum level-value and said second second-sort-monochromatic effective maximum level-value from said second first-monochromatic-histogram and said second second-monochromatic-histogram, respectively.

29. An image reader as set forth in claim 28, wherein each of said first first-sort-monochromatic effective maximum level-value, said first second-sort-monochromatic effective maximum level-value, said second first-sort-monochromatic effective maximum level-value and said second second-sort-monochromatic effective maximum level-value is defined as a boundary-level-value of a predetermined area, which includes an actual-maximum level-value, of the corresponding histogram.

30. An image reader as set forth in claim 28, wherein said color-image sensor comprises a line color-image sensor, and said sensing of said recorded image from said recording medium is performed by scanning said recorded image with said line color-image sensor.

31. An image reader as set forth in claim 30, wherein said scanning of said recorded image with said line color-image sensor is carried out by intermittently and relatively moving said recorded image with respect to said line color-image sensor, and said exposure of said line color-image sensor to said light rays over said first exposure period and said exposure of said line color-image sensor to said light rays over said second exposure period are successively carried out during the intermittent stoppage of said recorded image with respect to said line color-image sensor.

32. An image reader as set forth in claim 31, wherein each of said first histogram-producer and said second histogram-producer partially produces the corresponding two sorts of monochromatic histograms whenever the exposure of the line color-image sensor to said white-light rays over the corresponding exposure period is carried out.

\* \* \* \* \*